United States Patent
Kim et al.

(10) Patent No.: US 12,205,577 B1
(45) Date of Patent: Jan. 21, 2025

(54) VIRTUAL CONVERSATIONAL COMPANION

(71) Applicant: Amazon Technologies, Inc., Seattle, WA (US)

(72) Inventors: Taehwan Kim, La Crescenta, CA (US); Sanqiang Zhao, Pittsburgh, PA (US); Robinson Piramuthu, Oakland, CA (US); Seokhwan Kim, San Jose, CA (US); Yang Liu, Los Altos, CA (US); Gokhan Tur, Los Altos, CA (US); Eshan Bhatnagar, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 200 days.

(21) Appl. No.: 17/217,031

(22) Filed: Mar. 30, 2021

(51) Int. Cl.
*G10L 15/22* (2006.01)
*G06T 13/20* (2011.01)
(Continued)

(52) U.S. Cl.
CPC ........ *G10L 15/1815* (2013.01); *G06T 13/205* (2013.01); *G06T 13/40* (2013.01); *G06T 13/80* (2013.01); *G10L 13/08* (2013.01); *G10L 15/22* (2013.01); *G10L 25/57* (2013.01); *G10L 2015/227* (2013.01)

(58) Field of Classification Search
CPC ........ G10L 15/22; G10L 15/00; G10L 15/06; G10L 15/063; G10L 15/065; G10L 15/07; G10L 15/075; G10L 15/08; G10L 15/083; G10L 15/16; G10L 15/18; G10L 15/1822; G10L 15/183; G10L 15/20; G10L 15/26; G10L 15/28; G10L 2015/0631–0638; G10L 2015/221–228; G06F 40/27; G06F 40/295; G06F 40/30; G06F 40/35
USPC .... 704/257, 270.1, 270, 275, 276, 231, 243, 704/244, 258, 260, 266, 1, 9, 2
See application file for complete search history.

(56) References Cited

U.S. PATENT DOCUMENTS

| | | | |
|---|---|---|---|
| 10,318,586 B1 * | 6/2019 | Rose | G06F 16/285 |
| 2019/0295545 A1 * | 9/2019 | Andreas | G10L 15/1815 |
| 2020/0134103 A1 * | 4/2020 | Mankovskii | G06F 40/56 |

OTHER PUBLICATIONS

Breazeal, et al., (2016) "Social Robotics," In: Siciliano B., Khatib O. (eds) Springer Handbook of Robotics, https://doi.org/10.1007/978-3-31932552-1_72, pp. 1935-1971.
(Continued)

*Primary Examiner* — Qi Han
(74) *Attorney, Agent, or Firm* — Pierce Atwood LLP

(57) ABSTRACT

Techniques for rendering visual content, in response to one or more utterances, are described. A device receives one or more utterances that define a parameter(s) for desired output content. A system (or the device) identifies natural language data corresponding to the desired content, and uses natural language generation processes to update the natural language data based on the parameter(s). The system (or the device) then generates an image based on the updated natural language data. The system (or the device) also generates video data of an avatar. The device displays the image and the avatar, and synchronizes movements of the avatar with output of synthesized speech of the updated natural language data. The device may also display subtitles of the updated natural language data, and cause a word of the subtitles to be emphasized when synthesized speech of the word is being output.

18 Claims, 22 Drawing Sheets

(51) Int. Cl.
  *G06T 13/40*  (2011.01)
  *G06T 13/80*  (2011.01)
  *G10L 13/08*  (2013.01)
  *G10L 15/18*  (2013.01)
  *G10L 25/57*  (2013.01)

(56) References Cited

OTHER PUBLICATIONS

Turing, "Computing Machinery and Intelligence," Mind Journal, Oct. 1950, vol. LIX. No. 236, (retrieved from https://academic.oup.com/mind/article/LIX/236/433/986238), pp. 433-460.

Smith et al., "The Development of Embodied Cognition: Six Lessons from Babies," 2005 Massachusetts Institute of Technonolgy, Artificial Life, vol. 11, pp. 13-29.

Chen et al., "UNITER: UNiversal Image-TExt Representation Learning," 2020 European Conference on Computer Vision, arXiv:1909.11740, pp. 1-26.

Brown et al., "Language Models are Few-Shot Learners," (NeurIPS 2020), arXiv:2005.14165, pp. 1-25.

Breazeal, "Toward sociable robots," 2003, Robotics and Autonomous Systems, 42, pp. 167-175.

Greer, "Eight Ways to Help Improve Your Child's Vocabulary," https://lifehacker.com/eight-ways-to-help-improve-your-childs-vocabulary-1645796717, 2014, 9 pages.

Lan et al., "ALBERT: A Lite BERT for Self-Supervised Learning of Language Representations," International Conference on Learning Representations (ICLR 2020), arXiv:1909.11942, pp. 1-17.

Rajpurkar et al., "Squad: 100,000+ Questions for Machine Comprehension of Text," arXiv:1606.05250, 2016, 10 pages.

Gratch et al., "Can virtual humans be more engaging than real ones?", 12th International Conference on Human-Computer Interaction, Beijing, China, 2007, 10 pages.

Van Pinxteren et al., "Human-like communication in conversational agents: a literature review and research agenda," Journal of Service Management, vol. 31 No. 2, 2020, pp. 203-225.

Rasipuram et al., "Automatic multimodal assessment of soft skills in social interactions: a review," Multimedial Tools and Applications, 2020, 25 pages.

Price, "Ask Alexa or Google Home to Read your Child a Personalized Bedtime Story with this Skill," https://lifehacker.com/ask-alexa-or-google-home-to-read-your-child-a-personali-1829249795, 2018, 3 pages.

Briones, "How This Digital Avatar is Elevating AI Technology," ForbesLife, https://www.forbes.com/sites/isisbriones/2020/09/28/how-this-digital-avatar-is-elevating-ai-technology/?sh=696520a33a8a, 2020, 8 pages.

Zakharov et al., Few-Shot Adversarial Learning of Realistic Neural Talking Head Models, arXiv:1905.08233, 2019, pp. 1-21.

\* cited by examiner

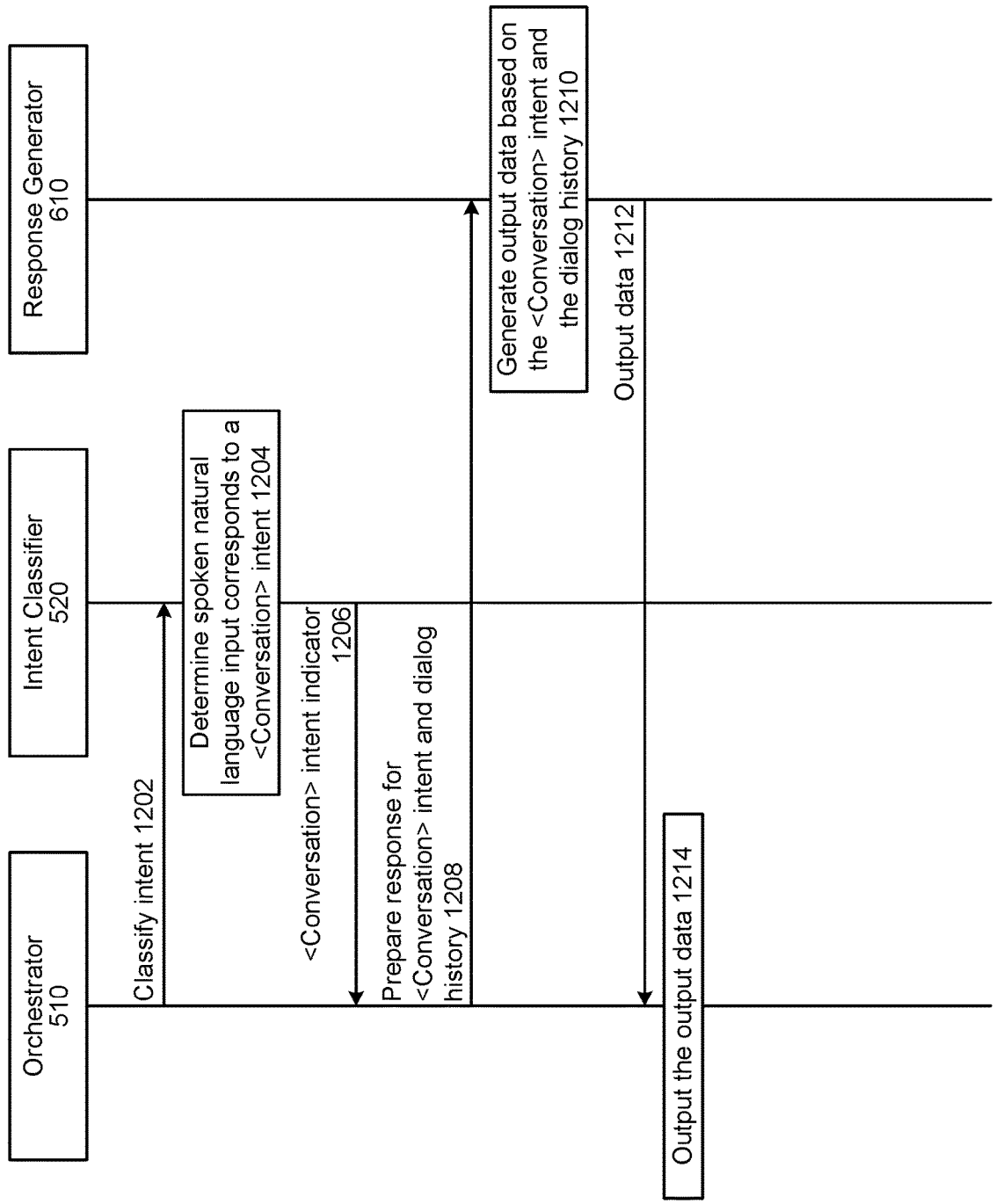

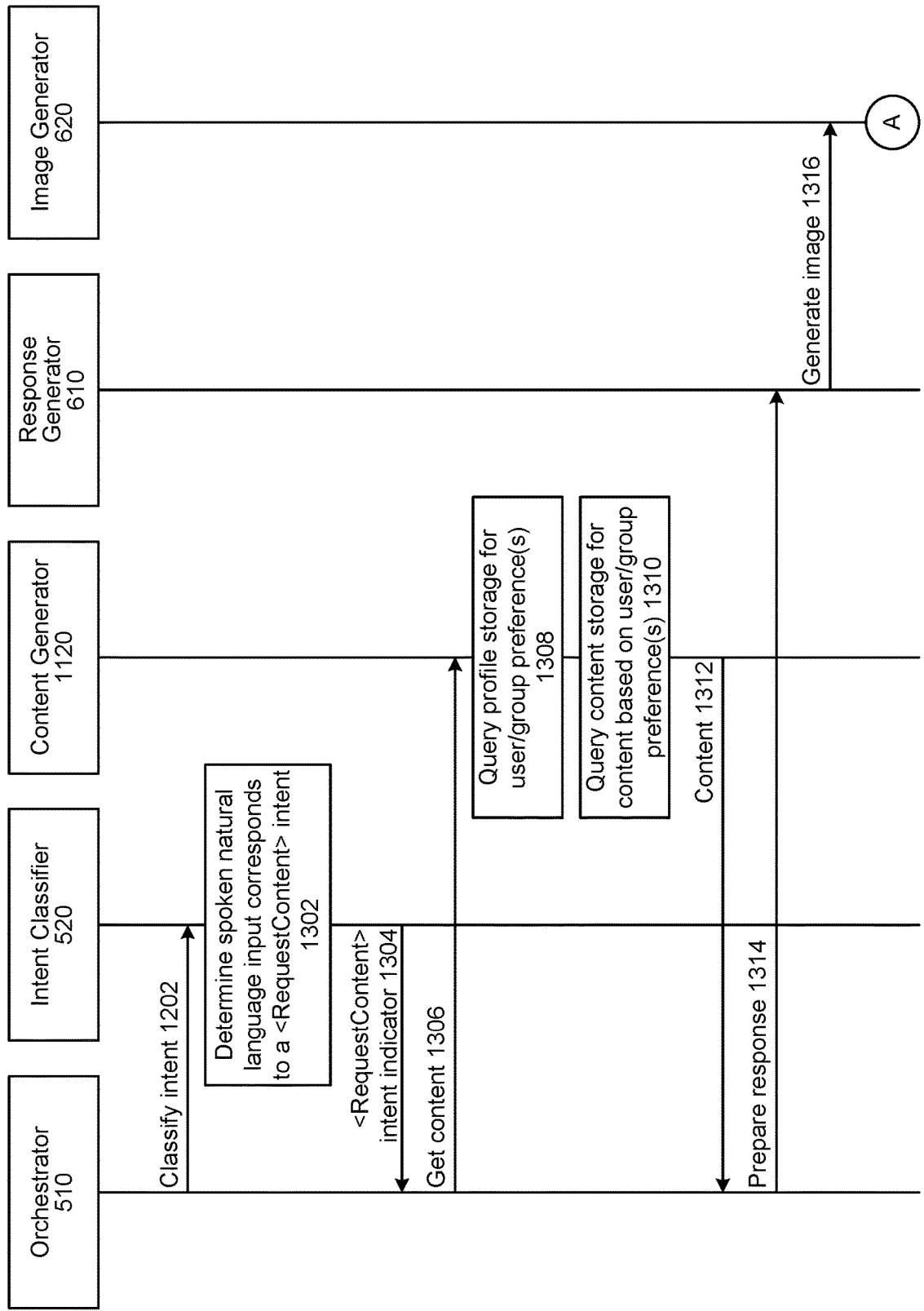

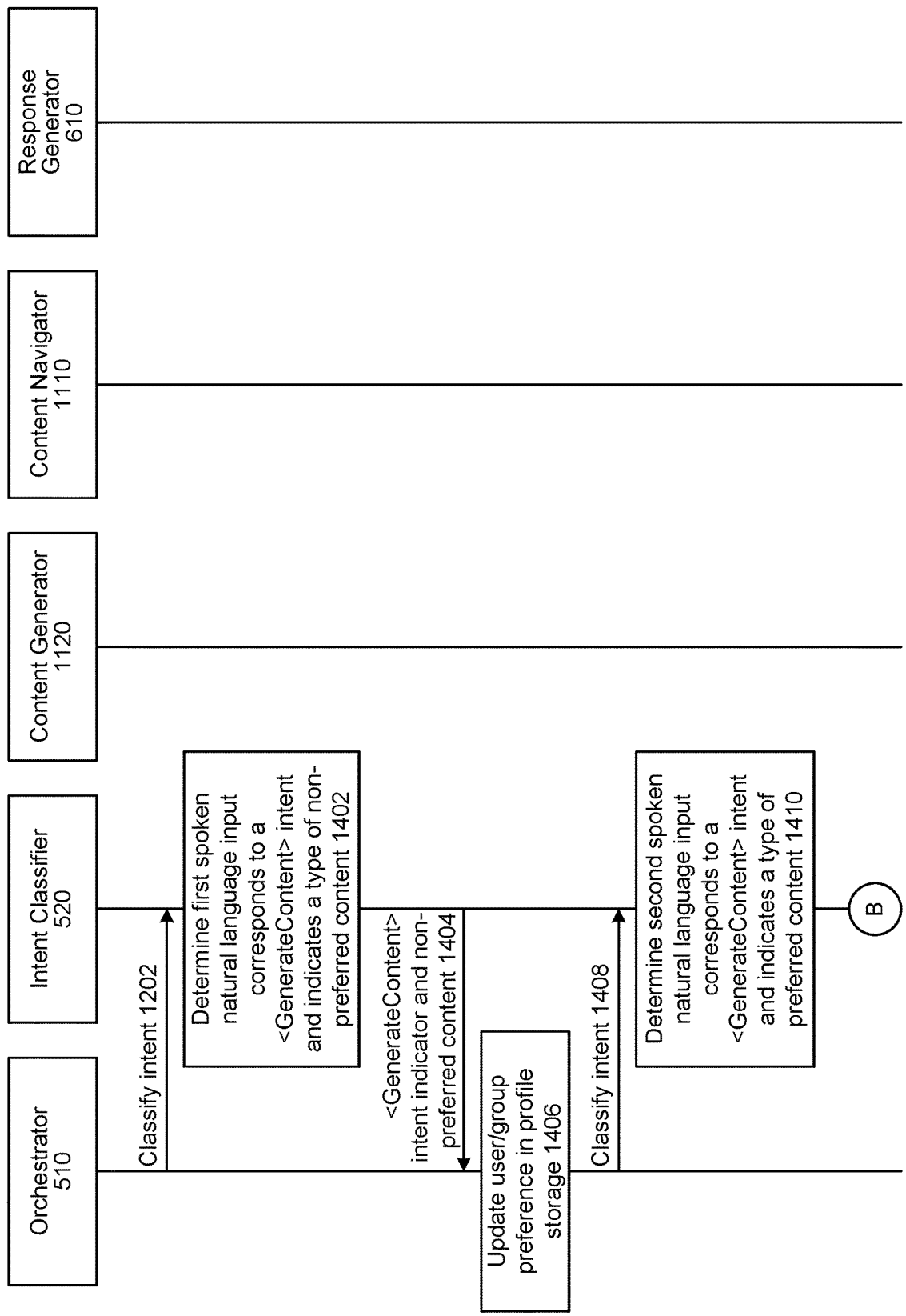

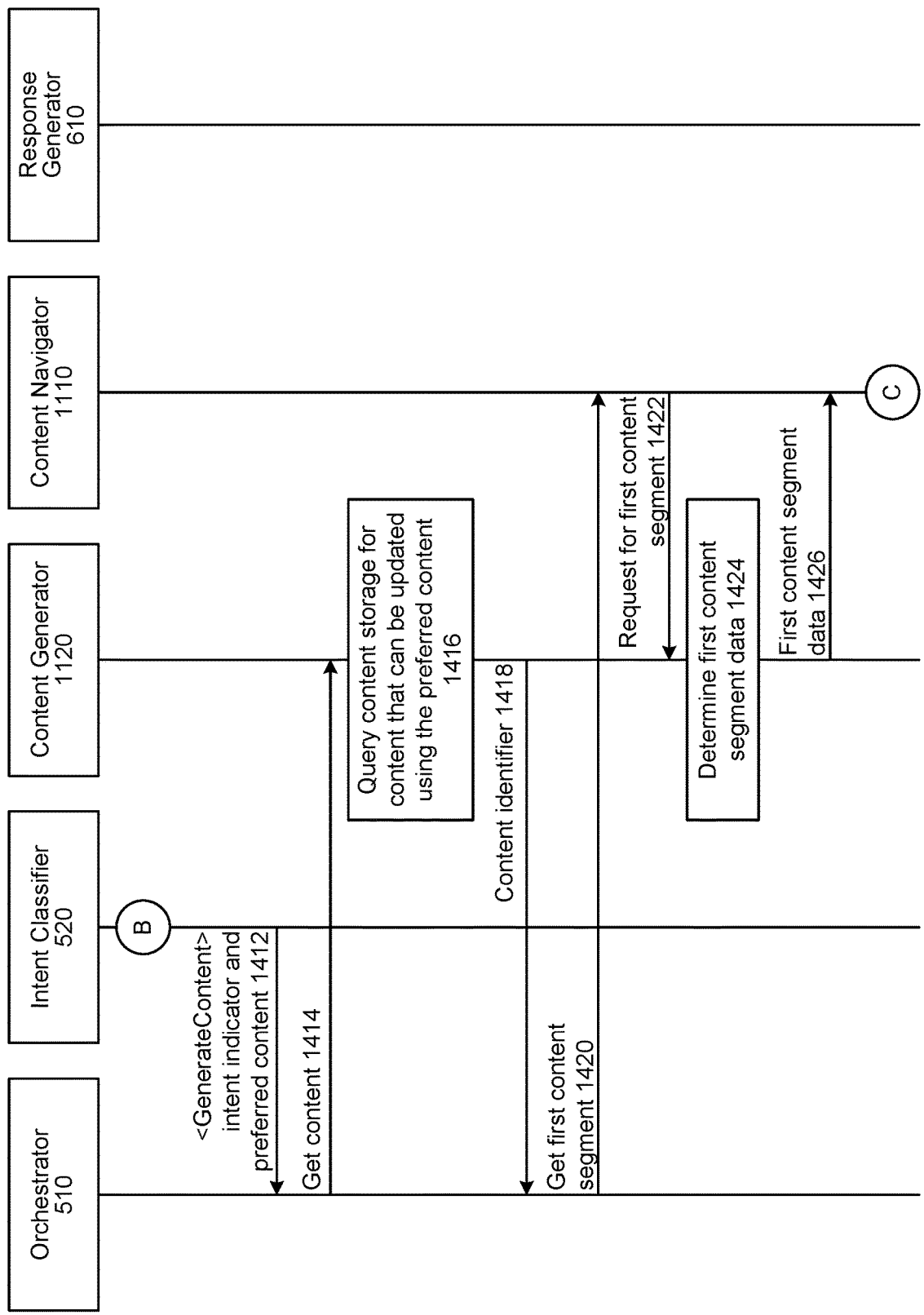

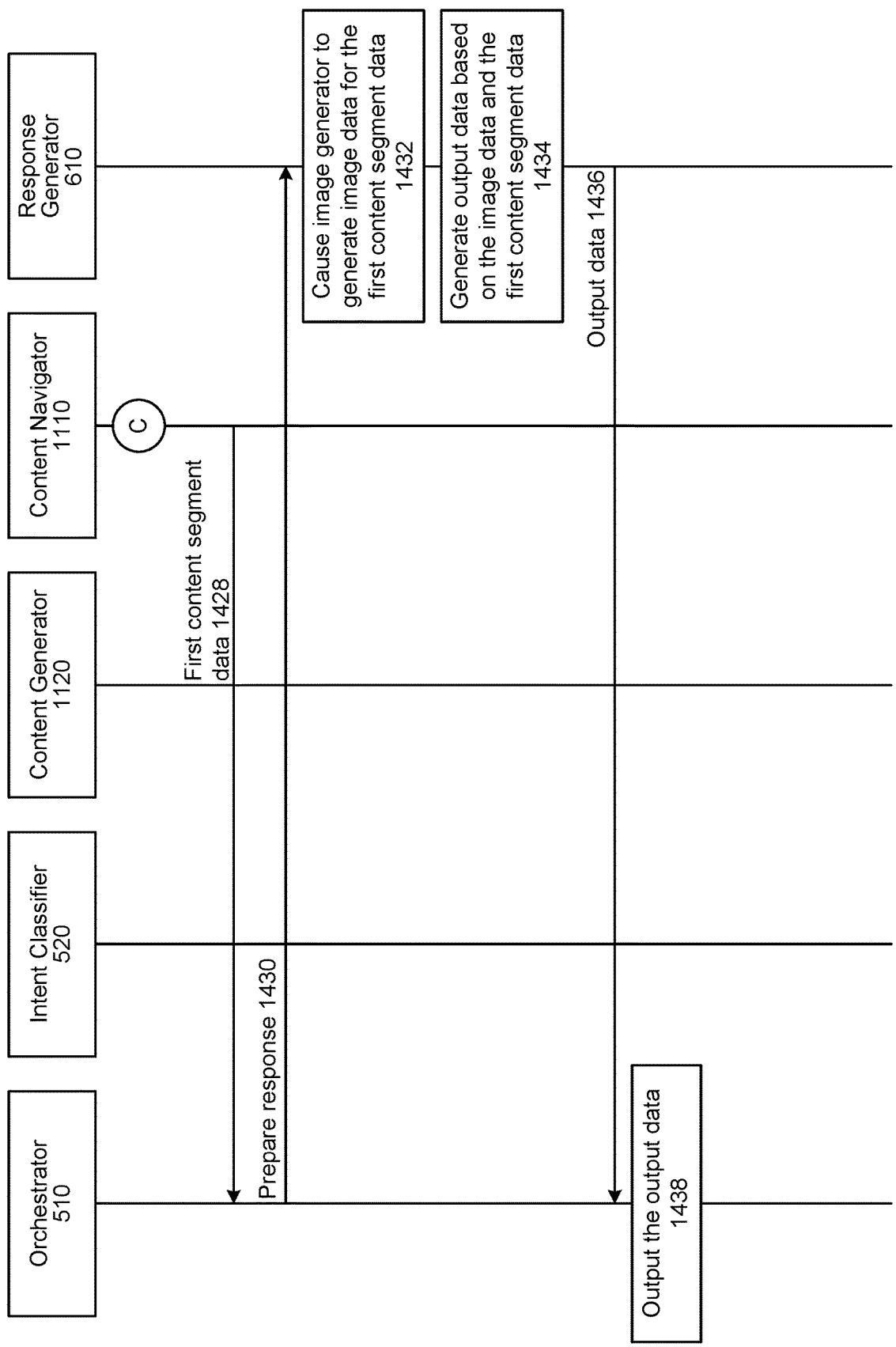

VIRTUAL CONVERSATIONAL COMPANION

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 12 is a signal flow diagram illustrating processing that may be performed in response to a <Conversation> intent, according to embodiments of the present disclosure.

FIGS. 13A-13B are a signal flow diagram illustrating processing that may be performed in response to a <RequestContent> intent, according to embodiments of the present disclosure.

FIGS. 14A-14C are a signal flow diagram illustrating processing that may be performed in response to a <GenerateContent> intent, according to embodiments of the present disclosure.

DETAILED DESCRIPTION

Figure 1:
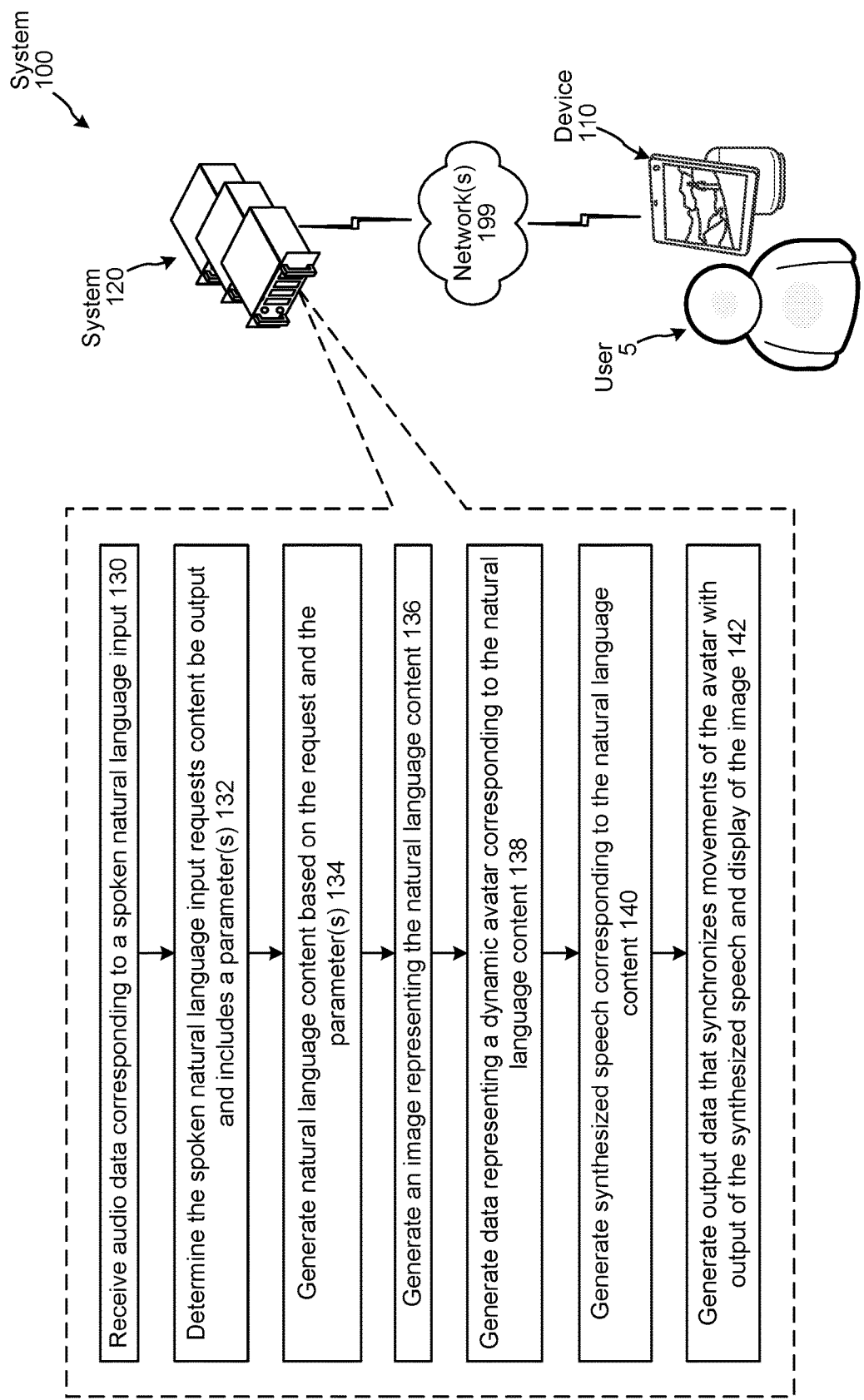
FIG. 1 is a conceptual diagram illustrating a system configured to provide a synchronized system output including synthesized speech, images, and personified visual representations of virtual assistants, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech. Natural language generation (NLG) is a field of computer science concerning generation of text from structured data, where the text represents meaningful phrases and sentences in a natural language form.

A system may output a system response, to a spoken natural language input, as synthesized speech using TTS processing. For example, a system may output synthesized speech of weather information in response to the spoken natural language input "what is today's weather."

In some instances, a system may output a system response, to a spoken natural language input, as synthesized speech and displayed content. For example, a system may output synthesized speech representing the time remaining on a timer, and display the corresponding timer information in response to the spoken natural language input "how much time is left on my timer."

A system of the present disclosure is configured to provide a further synchronized system output that includes synthesized speech, images, and personified visual representations of virtual assistants (e.g., an avatar). Such a synchronized system output may be provided in relation to a dialog that the user may be engaged in with the system. The synchronized system output may be provided in relation to the system outputting contents of a story (e.g., telling/reading a story). As an example, a user may utter a spoken natural language input requesting a story with a particular character type (e.g., particular type of animal, a vehicle, a human, etc.), scene, plot, etc. be output. In response, the system may identify a story and perform natural language generation processing to alter the story based on the particular character type, scene, plot, etc. The system may select a beginning portion of the altered story and generate synthesized speech corresponding thereto. The system may also generate, at runtime, an image based on the selected beginning portion of the altered story (e.g., an image depicting the beginning portion of the altered story). In addition, the system may generate an avatar (e.g., a visual representation of a face, head portion, or body) having facial expressions corresponding to the selected beginning portion of the altered story. The system may synchronize display of the facial expressions of the avatar with output of the synthesized speech ("reading" the story) and display of the generated image. As such, it will be appreciated that the teachings herein provide an improved user experience.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to provide a synchronized system output including synthesized speech, images, and personified visual representations of virtual assistants. Although the figures and discussion of the present disclosure illustrate certain processes in a particular order, the processes described may be performed in a different order (as well as certain processes removed or added) without departing from the present disclosure.

As shown in FIG. 1, the system 100 may include a device 110 (local to a user 5) and a system 120 in communication across a network(s) 199. The network 199 may include the Internet and/or any other wide- or local-area network, and may include wired, wireless, and/or cellular network hardware. While the user 5 is illustrated as a human, it will be appreciated that the present disclosure is not limited thereto, and that the user 5 may be a non-human such as an application, bot, or the like.

The device 110 may receive audio of a spoken natural language input from the user 5. The device 110 generates audio data corresponding to the audio, and sends the audio data to the system 120.

The system 120 receives (130) the audio data corresponding to the spoken natural language input, and determines (132) the spoken natural language input requests content be output and includes a parameter(s). For example, the system 120 may perform ASR processing using the audio data to generate ASR output data, and may perform NLU processing using the ASR output data to generate NLU output data representing the natural language input requests a certain content be output, and that the natural language input includes one or more parameters. Alternatively, the system 120 may perform SLU processing using the audio data to generate the NLU output data, without first/separately generating the ASR output data.

In some embodiments, the NLU output data may indicate the spoken natural language input requests output of a story, where a story is an example type of content. For example, the user 5 may say "Alexa, can you read a story for me with a lion?" In this example, the NLU output data may indicate the spoken natural language input includes a parameter indicating a preferred character type of "lion." In other embodiments, the NLU output data may indicate the parameter represents a preferred story setting (e.g., a place, a time period, etc.), a preferred plot, and/or the like. In some embodiments, the spoken natural language input may include a title of the story (or a book or other type of content) that the user 5 is requesting output of, and the NLU output data may include title data indicating the title of the story. As used herein, a "story" may refer to fictional content including one or more of a character(s), a setting, a plot, a beginning, an ending, and other features. The story may be represented as text data. The story may be represented in a natural language form.

The system 120 generates (134) natural language content based on the request and the parameter(s). For example, the system 120 may determine text data corresponding to a story, where the story may relate to the user request (e.g., relate to a title or any other information provided by the user 5 in the spoken natural language input). The system 120 may use natural language generation (NLG) processing to generate the natural language content, where the natural language content may be based on the text data corresponding to the story. In some embodiments, the system 120, using NLG processing, may modify/update the text data for the story based on the parameter(s). Details on how the system 120 may generate the natural language content are described below in relation to FIG. 11.

The system 120 also generates (136) an image representing the natural language content. Continuing the foregoing example, the system 120 may determine a beginning portion of the natural language content representing the story updated based on the parameter(s). The system 120 may then generate an image based on the updated text data for the updated story. For example, if the beginning portion of the updated story refers to a particular location, for example a forest, and a particular time of day, for example night time, then the generated image may represent a forest at night time (e.g., the image may include many trees, a moon, a dark sky, etc.). Thus, the generated image may visually illustrate the updated story. Details on how the system 120 may generate the image are described below in relation to FIG. 6.

The system 120 also generates (138) data representing a dynamic avatar corresponding to the natural language content. As used herein, "avatar" may refer to a computer generated representation of a human or story character, or a representation of a real human that is manipulated as described herein. In some embodiments, the data may be video data including a face or head portion capable of having different facial expressions. The avatar may be based on a character represented in the natural language content, and may be rendered to emulate one or more emotions, sentiments, actions, and/or other physical expressions of the character based on the natural language content. In some embodiments, the avatar may represent a narrator, and may be rendered to illustrate reading (e.g., moving the avatar's mouth) of the natural language content and may be rendered to emulate one or more emotions, sentiments, actions, and/or other physical expressions based on the natural language content. Details on how the system 120 may generate the avatar are described below in relation to FIG. 6.

The system 120 also generates (140) synthesized speech corresponding to the natural language content. Continuing the foregoing example, the system 120 may perform TTS processing on the updated text data to generate synthesized speech corresponding thereto.

The system 120 generates (142) output data that synchronizes movements of the avatar with output of the synthesized speech and display of the image. The output data may combine the different streams of output: video of the avatar, audio of the story, and image of the story. The output data may include data (e.g., time markers) that enables the output of the different streams in a synchronized manner.

The system 120 may send the output data to the device 110, and the device 110 may synchronously output the video, synthesized speech, and image. In this manner, the system 120 may cause the device 110 to render an avatar that is speaking the words represented in the synthesized speech as the synthesized speech is output, where the synthesized speech represents the natural language content. The image may be displayed as a background to the avatar. In some embodiments, the image may be displayed in a portion of a display screen of the device 110, while the avatar may be displayed in another portion (a non-overlapping portion) of the display screen. Details on how the system 120 may generate the synchronized output data are described below in relation to FIG. 6.

While the foregoing description of FIG. 1 describes processing performed by the system 120, the present disclosure is not limited thereto. In some embodiments, the system 120 and the device 110 may each perform a portion of the functionalities described above with respect to FIG. 1. In some embodiments, the device 110 may perform all the functionalities described above with respect to FIG. 1.

The example described above relates to outputting of a story using synthesized speech that is synchronized with a dynamic avatar and images representing the story. In other examples, the system 120 may use the above-described functionalities to output information relating to a product using synthesized speech describing the product features, a dynamic avatar synchronized to the synthesized speech describing the product features, and images representing particular portions of the product while the particular features are being described. In yet other examples, the system 120 may use the above-described functionalities to output information relating to a museum, restaurant, or other business establishment using synthesized speech describing the business establishment, a dynamic avatar synchronized to the synthesized speech describing the business establishment, and images representing particular aspects of the business establishment while the particular features are being described.

Figure 2:
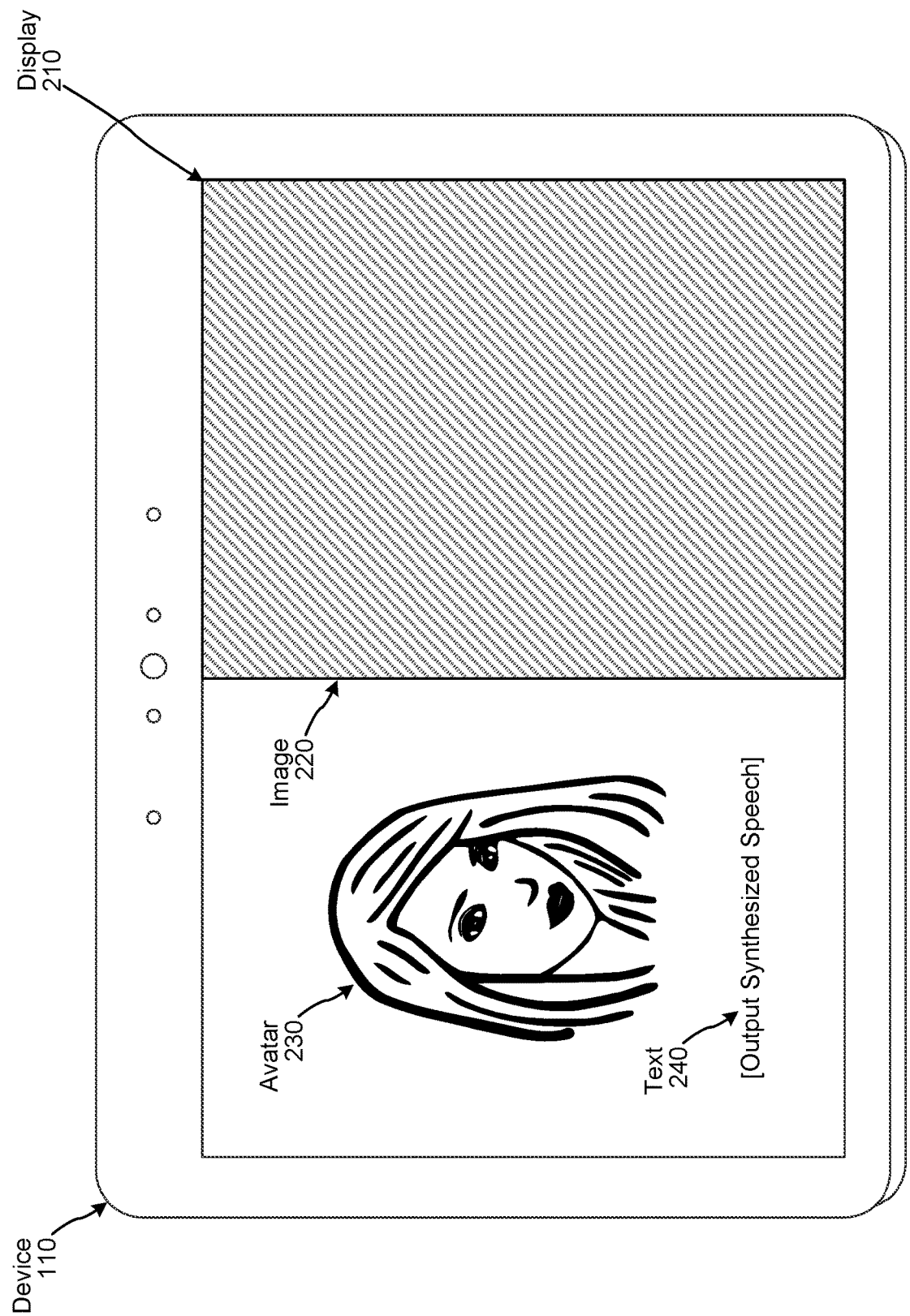
FIG. 2 illustrates an example graphical user interface (GUI) corresponding to output data described with respect to FIG. 1, according to embodiments of the present disclosure.

FIG. 2 shows an example graphical user interface (GUI) corresponding to the output data described with respect to FIG. 1. As illustrated, the device 110 may include a display 210. In some embodiments, the device 110 may not include the display 210, but may be in communication with the display 210. For example, the device 110 may communicate with a smart TV or other device including a display, and the device 110 may send data to the smart TV or other device to display the GUI of FIG. 2.

The GUI may include a static portion and a dynamic portion. The static portion may include the image 220 generated at step 136 of FIG. 1. The dynamic portion may include the avatar 230, generated at step 138 of FIG. 1, and text 240 corresponding to the natural language content generated at step 134 of FIG. 1. In some embodiments, the visual appearance (e.g., color, font, size, etc.) of words in the text 240 may be modified such that the visual appearance of a word is highlighted or otherwise emphasized while synthesized speech representing the word is simultaneously output by the device 110. In some embodiments, the video of the avatar 230 may be output/rendered such that the avatar 230 appears to be speaking the words in the synthesized speech as the words are output. In some embodiments, the video of the avatar 230 may be played such that the avatar 230 appears to be speaking the words in the text 240 as the visual appearances of the words in the text 240 are altered to synchronize with the output of the synthesized speech.

It will be appreciated that the locations, sizing, and other configurations of the image 220, the avatar 230, and the text 240 in FIG. 2 are merely illustrative, and are configurable. In some embodiments, more than one avatar may be presented on the display 210 at a single point in time. For example, an avatar of a narrator of a story may be presented along with one or more avatars corresponding to one or more characters of a story. In such embodiments, the text 240 may include natural language spoken by the different avatars.

In some embodiments, different functionality described herein may be associated with different avatars. For example, story narration functionality may be associated with a first avatar identifier corresponding to a first avatar, a question and answer functionality may be associated with a second avatar identifier corresponding to a second avatar, etc. Each output data may include an avatar identifier. Thus, when specific functionality is being executed/output, the avatar of the specific functionality may be displayed.

Figure 3:
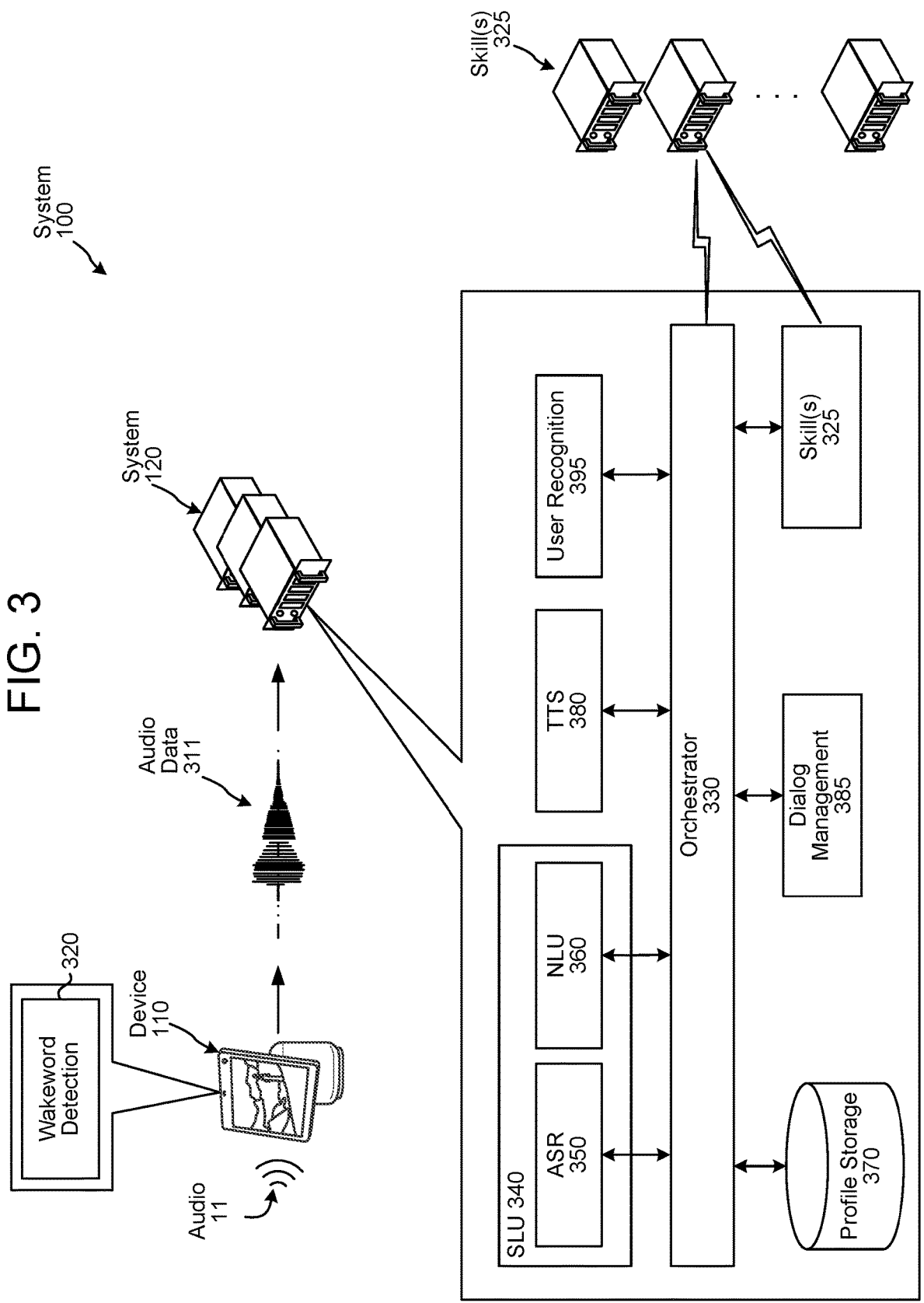
FIG. 3 is a conceptual diagram of components of the system, according to embodiments of the present disclosure.

The system 100 may operate using various components as illustrated in FIG. 3. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 320. The wakeword detection component 320 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 320 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 320 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 320 detects a wakeword, the device 110 may "wake" and begin transmitting audio data 311, representing the audio 11, to the system 120. The audio data 311 may include the detected wakeword, or the device 110 may remove the portion of the audio data, corresponding to the detected wakeword, prior to sending the audio data 311 to the system 120.

The system 120 may include an orchestrator component 330 configured to, among other things, coordinate data transmissions between components of the system 120. The orchestrator component 330 may receive the audio data 311 from the device 110, and send the audio data 311 to an ASR component 350.

The ASR component 350 transcribes the audio data 311 into ASR output data including one or more ASR hypotheses. An ASR hypothesis may be configured as a textual interpretation of the speech in the audio data 311, or may be configured in another manner, such as one or more tokens. Each ASR hypothesis may represent a different likely interpretation of the speech in the audio data 311. Each ASR hypothesis may be associated with a score (e.g., confidence score, probability score, or the like) representing the associated ASR hypothesis correctly represents the speech in the audio data 311.

The ASR component 350 interprets the speech in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the speech represented in the audio data 311.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 330. The orchestrator component 330 may send the text data or ASR output data, depending on the type of natural language input received, to a NLU component 360.

The NLU component 360 processes the ASR output data or text data to determine one or more NLU hypotheses embodied in NLU output data. The NLU component 360 may perform intent classification (IC) processing on the ASR output data or text data to determine an intent of the natural language input. An intent corresponds to an action to be performed that is responsive to the natural language input. To perform IC processing, the NLU component 360 may communicate with a database of words linked to intents. For example, a music intent database may link words and phrases such as "quiet," "volume off," and "mute" to a <Mute> intent. The NLU component 360 identifies intents by comparing words and phrases in ASR output data or text data to the words and phrases in an intents database. In some embodiments, the NLU component 360 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 360 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 360 may be linked to one or more grammar frameworks with entity types to be populated with entity values. Each entity type of a grammar framework corresponds to a portion of ASR output data or text data that the NLU component 360 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 360 may perform NER processing to identify words in ASR output data or text data as subject, object, verb, preposition, etc. based on grammar rules and/or models. Then, the NLU component 360 may perform IC processing using the identified verb to identify an intent. Thereafter, the NLU component 360 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 360 may generate NLU output data including one or more NLU hypotheses, with each NLU hypothesis including an intent and optionally one or more entity types and corresponding entity values. In some embodiments, the NLU component 360 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 350 and the NLU component 360). In at least some embodiments, the system 120 may implement a spoken language understanding (SLU) component 340 configured to process audio data 311 to determine NLU output data.

The SLU component 340 may be equivalent to a combination of the ASR component 350 and the NLU component 360. Yet, the SLU component 340 may process audio data 311 and directly determine the NLU output data, without an intermediate step of generating ASR output data. As such, the SLU component 340 may take audio data 311 representing a spoken natural language input and attempt to make a semantic interpretation of the spoken natural language input. That is, the SLU component 340 may determine a meaning associated with the spoken natural language input and then implement that meaning. For example, the SLU component 340 may interpret audio data 311 representing a spoken natural language input in order to derive a desired action. The SLU component 340 may output a most likely NLU hypothesis, or multiple NLU hypotheses associated with respective confidence or other scores (such as probability scores, etc.).

The system 120 may include or otherwise communicate with one or more skills 325. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 325 may operate in conjunction between the system 120 and other devices, such as the device 110, a restaurant electronic ordering system, a taxi electronic booking system, etc. in order to complete certain functions. Inputs to a skill 325 may come from speech processing interactions or through other interactions or input sources.

A skill 325 may be associated with a domain, a non-limiting list of which includes a smart home domain, a music domain, a video domain, a weather domain, a communications domain, a flash briefing domain, a shopping domain, and a custom domain.

The system 120 may include a TTS component 380 that generates audio data including synthesized speech. The data input to the TTS component 380 may come from a skill 325, the orchestrator component 330, or another component of the system 120.

In one method of synthesis called unit selection, the TTS component 380 matches input data against a database of recorded speech. The TTS component 380 selects matching units of recorded speech and concatenates the units together to form audio data. In another method of synthesis called parametric synthesis, the TTS component 380 varies parameters such as frequency, volume, and noise to determine audio data including an artificial speech waveform. Parametric synthesis uses a computerized voice generator, sometimes called a vocoder.

The system 120 may include a user recognition component 395. The user recognition component 395 may recognize one or more users using various data. The user recognition component 395 may take as input the audio data 311. The user recognition component 395 may perform user recognition by comparing speech characteristics, in the audio data 311, to stored speech characteristics of users. The user recognition component 395 may additionally or alternatively perform user recognition by comparing biometric data (e.g., fingerprint data, iris data, retina data, etc.), received by the system 120 in correlation with a natural language input, to stored biometric data of users. The user recognition component 395 may additionally or alternatively perform user recognition by comparing image data (e.g., including a representation of at least a feature of a user), received by the system 120 in correlation with a natural language input, with stored image data including representations of features of different users. The user recognition component 395 may perform other or additional user recognition processes, including those known in the art. For a particular natural language input, the user recognition component 395 may perform processing with respect to stored data of users associated with the device 110 that received the natural language input.

The user recognition component 395 determines whether a natural language input originated from a particular user. For example, the user recognition component 395 may determine a first value representing a likelihood that a natural language input originated from a first user, a second value representing a likelihood that the natural language input originated from a second user, etc. The user recognition component 395 may also determine an overall confidence regarding the accuracy of user recognition processing.

The user recognition component 395 may output a single user identifier corresponding to the most likely user that originated the natural language input. Alternatively, the user recognition component 395 may output multiple user identifiers (e.g., in the form of an N-best list) with respective values representing likelihoods of respective users originating the natural language input. The output of the user recognition component 395 may be used to inform NLU processing, processing performed by a skill 325, as well as processing performed by other components of the system 120 and/or other systems.

The system 120 may include profile storage 370. The profile storage 370 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 370 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 325 that the user has enabled. When a user enables a skill 325, the user is providing the system 120 with permission to allow the skill 325 to execute with respect to the user's natural language inputs. If a user does not enable a skill 325, the system 120 may not execute the skill 325 with respect to the user's natural language inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 370 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 may also include a dialog management component 385, which is described in detail herein below with respect to FIGS. 5-15B.

The system 120 may include a sentiment detection component configured to analyze image data representing a face of a user, and/or speech of the user (in particular tone, words, used, etc.), to determine a sentiment (e.g., happy, sad, mad, etc.) of the user. Various processing described herein may be based on the sentiment. For example, a story plot may be determined based at least in part on the user's sentiment.

Figure 4:
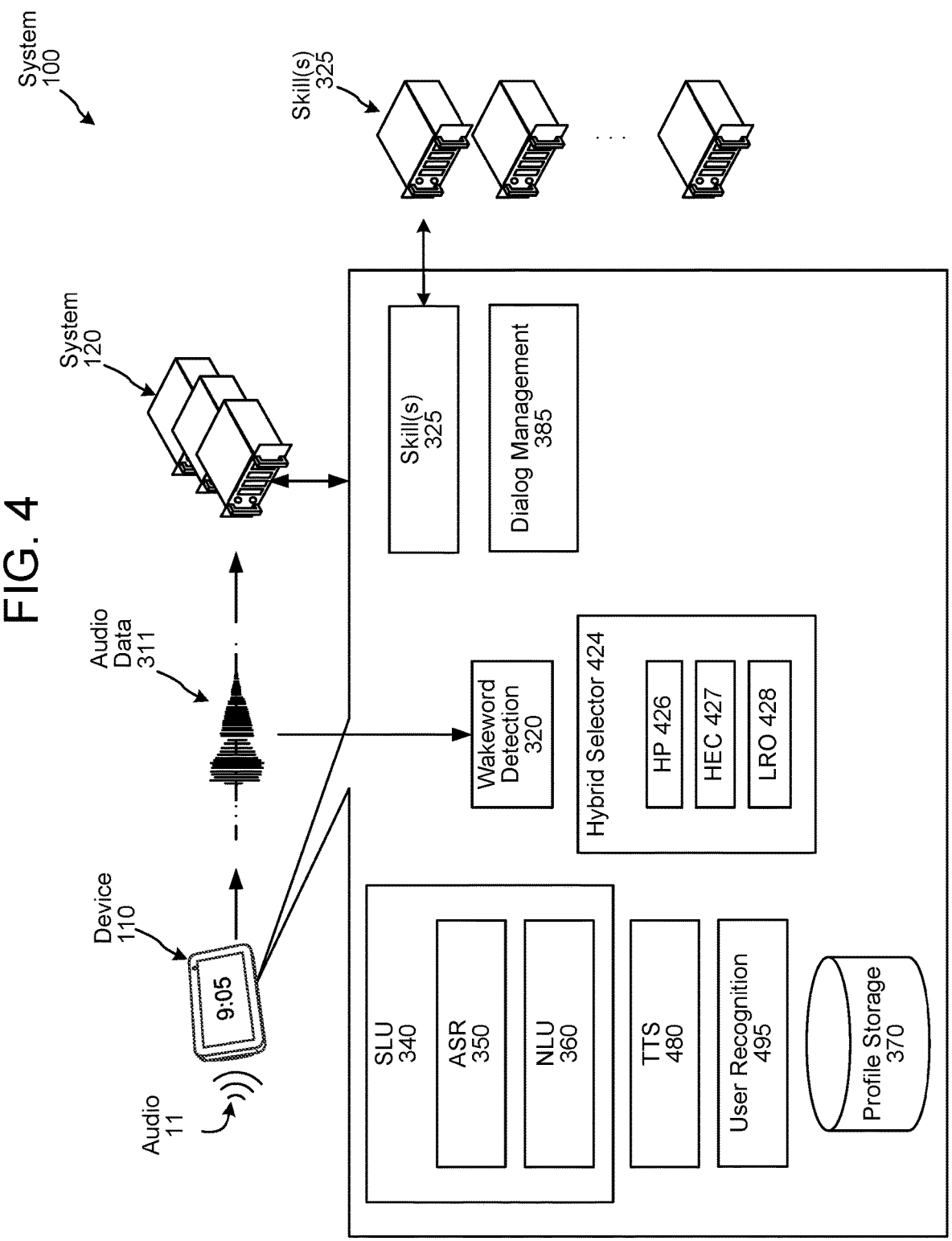
FIG. 4 is a conceptual diagram illustrating components that may be included in a device, according to embodiments of the present disclosure.

The foregoing describes illustrative components and processing of the system 120. The following describes illustrative components and processing of the device 110. As illustrated in FIG. 4, in at least some embodiments the system 120 may receive the audio data 311 from the device 110, to recognize speech corresponding to a spoken natural language in the received audio data 311, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 3, the device 110 may include a wakeword detection component 320 configured to used to detect a wakeword (e.g., "Alexa") that indicates to the device 110 that the audio data 311 is to be processed for determining NLU output data. In at least some embodiments, a hybrid selector 424, of the device 110, may send the audio data 311 to the wakeword detection component 320. If the wakeword detection component 320 detects a wakeword in the audio data 311, the wakeword detection component 320 may send an indication of such detection to the hybrid selector 424. In response to receiving the indication, the hybrid selector 424 may send the audio data 311 to the system 120 and/or an on-device ASR component 350. The wakeword detection component 320 may also send an indication, to the hybrid selector 424, representing a wakeword was not detected. In response to receiving such an indication, the hybrid selector 424 may refrain from sending the audio data 311 to the system 120, and may prevent the on-device ASR component 350 from processing the audio data 311. In this situation, the audio data 311 can be discarded.

The device 110 may conduct its own speech processing using on-device language processing components (such as an on-device SLU component 340, an on-device ASR component 350, and/or an on-device NLU component 360) similar to the manner discussed above with respect to the speech processing system-implemented SLU component 340, ASR component 350, and NLU component 360. The device 110 may also internally include, or otherwise have access to, other components such as one or more skills 325, a user recognition component 395 (configured to process in a similar manner to the speech processing system-implemented user recognition component 395), profile storage 370 (configured to store similar profile data to the speech processing system-implemented profile storage 370), the dialog management component 385, and other components. In at least some embodiments, the on-device profile storage 370 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 424, of the device 110, may include a hybrid proxy (HP) 426 configured to proxy traffic to/from the system 120. For example, the HP 426 may be configured to send messages to/from a hybrid execution controller (HEC) 427 of the hybrid selector 424. For example, command/directive data received from the system 120 can be sent to the HEC 427 using the HP 426. The HP 426 may also be configured to allow the audio data 311 to pass to the system 120 while also receiving (e.g., intercepting) this audio data 311 and sending the audio data 311 to the HEC 427.

In at least some embodiments, the hybrid selector 424 may further include a local request orchestrator (LRO) 428 configured to notify the on-device ASR component 350 about the availability of the audio data 311, and to otherwise initiate the operations of on-device language processing when the audio data 311 becomes available. In general, the hybrid selector 424 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 311 is received, the HP 426 may allow the audio data 311 to pass through to the system 120 and the HP 426 may also input the audio data 311 to the on-device ASR component 350 by routing the audio data 311 through the HEC 427 of the hybrid selector 424, whereby the LRO 428 notifies the on-device ASR component 350 of the audio data 311. At this point, the hybrid selector 424 may wait for response data from either or both the system 120 and/or the on-device language processing components. However, the disclosure is not limited thereto, and in some examples the hybrid selector 424 may send the audio data 311 only to the on-device ASR component 350 without departing from the disclosure. For example, the device 110 may process the audio data 311 on-device without sending the audio data 311 to the system 120.

The on-device ASR component 350 is configured to receive the audio data 311 from the hybrid selector 424, and to recognize speech in the audio data 311, and the on-device NLU component 360 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 360) may be selected as usable to respond to a natural language input, and local response data may be sent (e.g., local NLU output data, local knowledge base information, internet search results, and/or local directive data) to the hybrid selector 424, such as a "ReadyToExecute" response. The hybrid selector 424 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 311 to the system 120, and the response data from the system 120 may include the unique identifier to identify to which natural language input the response data corresponds.

In at least some embodiments, the device 110 may include one or more skills 325 that may process similarly to the speech processing system-implemented skill(s) 325. The skill(s) 325 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 5:
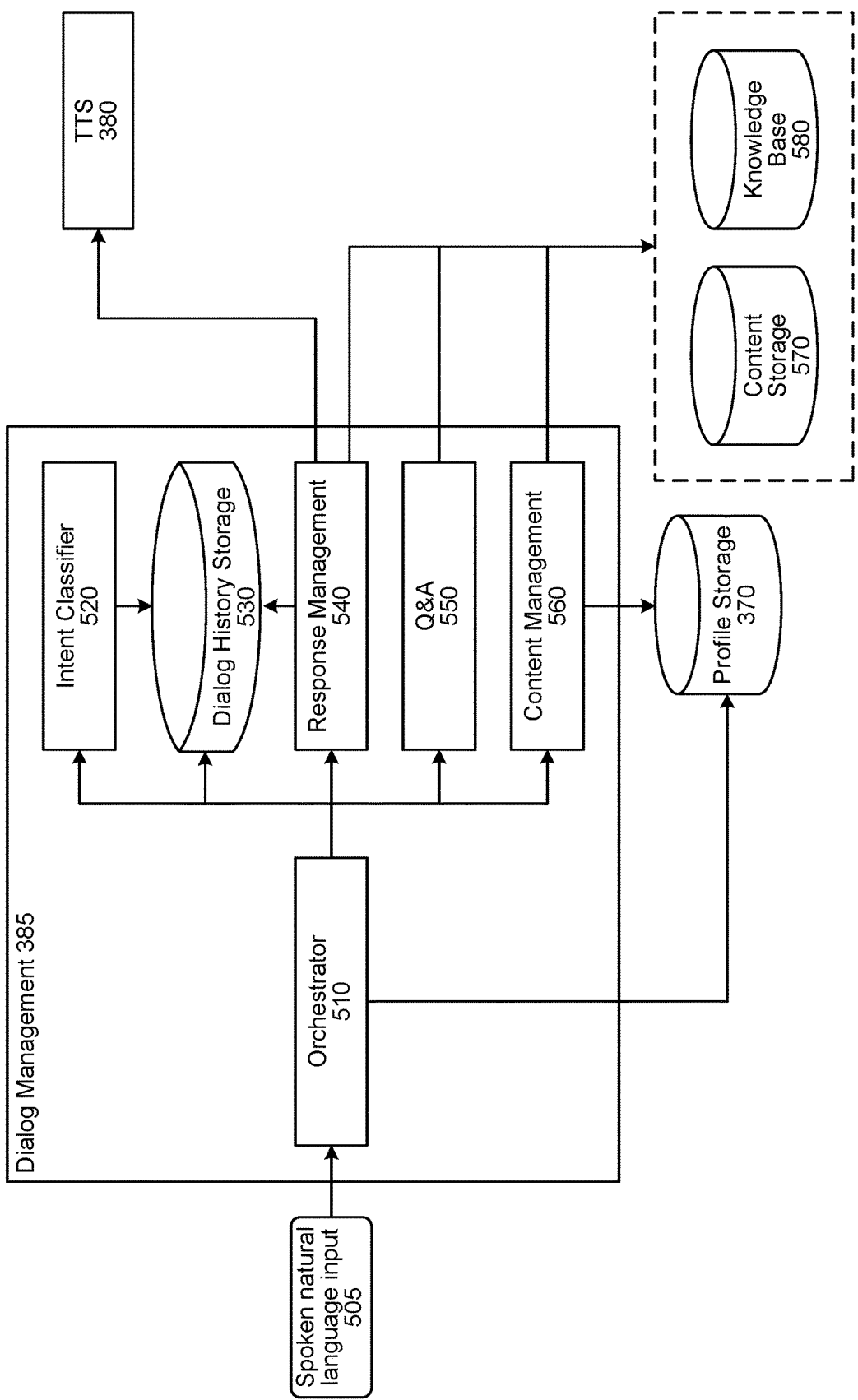
FIG. 5 is a conceptual diagram illustrating a dialog management component, according to embodiments of the present disclosure.

Referring now to FIG. 5, the dialog management component 385, implemented by the system 120 or the device 110, is described. In some embodiments, the dialog management component 385 may be implemented as a skill. It is noted that the arrows in FIG. 5 represent which components may call which other components of the dialog management component 385, but the arrows do not necessary represent a runtime call sequence. The dialog management component 385 may include an orchestrator component 510, an intent classifier component 520, a dialog history storage 530, a response management component 540, a question and answering (Q&A) component 550, and a content management component 560.

The orchestrator component 510 may be configured to receive spoken natural language input data 505 representing a spoken natural language input. The spoken natural language input data 505 may include ASR output data and/or NLU output data. The orchestrator component 510 is configured to coordinate the transmission of data between components of the dialog management component 385. The orchestrator component 510 may selectively call one or more components, of the dialog management component 385, based on the intent of the spoken natural language input.

At runtime, the system 120/device 110 may receive a first spoken natural language input corresponding to a dialog. As used herein, a "dialog" may refer to an exchange of related spoken natural language inputs and system-generated responses. A dialog may be goal-oriented, meaning the dialog is directed to the performance of a specific action (e.g., figuring out what music the system should play). A spoken natural language input and performance of a corresponding action (i.e., a system-generated response), may be referred to as a dialog "turn." A dialog identifier may be associated with multiple related turns corresponding to consecutive related spoken natural language inputs and system outputs. Each turn may be associated with a respective turn identifier. One spoken natural language input may be considered related to a subsequent spoken natural language input, thereby causing a single dialog identifier to be associated with both spoken natural language inputs. A first spoken natural language input may be considered related to a second (subsequent) spoken natural language input based on, for example, a length of time between receipt of the first and second spoken natural language inputs, a length of time between performance of a system-generated response to the first spoken natural language input and receipt of the second spoken natural language input, the substances of the first and second spoken natural language inputs, and/or the substances of the second spoken natural language input and the system-generated response to the first spoken natural language input.

As disclosed above, the NLU component 360 is configured to determine an intent of a spoken natural language input. At runtime, the NLU component 360 may determine the aforementioned first spoken natural language input corresponds to an intent associated with the dialog management component 385. In response to such, first spoken natural language input data 505a, corresponding to the first spoken natural language input, may be sent to the dialog management component 385, resulting in the dialog management component 385 becoming "in focus" for a dialog including the first spoken natural language input. The dialog management component 385 may process to determine output data responsive to the first spoken natural language input, and may cause same to be output to the user 5. Thereafter, when a second spoken natural language input is received, the system 120/device 110 may determine the second spoken natural language input corresponds to the same dialog as the first natural language input, and determine the dialog management component 385 being in focus for the dialog. Based on the dialog management component 385 being in focus, the second spoken natural language input may not undergo NLU processing by the NLU component 360. Rather, second spoken natural language input data 505b, including ASR output data corresponding to the second spoken natural language input, may be sent to the dialog management component 385.

In the foregoing situation, the intent classifier component 520 may be executed to process the ASR output data to determine an intent of the second spoken natural language input. The intent classifier component 520 is configured to determine one or more intents executable by the dialog management component 385. In some embodiments, the dialog management component 385 is configured to engage the user 5 in a storytelling user experience that optionally includes question and answering functionality. In such embodiments, the intent classifier component 520 may be configured to determine intents such as a <RequestStory> intent representing a spoken natural language input requests a story being output; a <StoryNavigation> intent representing a spoken natural language input requests a different section (e.g., previous page, next page, etc.) of a book be output, or representing a spoken natural language input requests a different story be output; a <QuestionAnswer> intent representing a spoken natural language input requests an answer to a question embodied in the spoken natural language input; a <ChangeStory> intent representing a spoken natural language input requests a different story be output; and/or a <Conversation> intent representing a spoken natural language input provides information requested by the dialog management system 385 in order to perform an action.

The intent classifier component 520 may be configured using various techniques. In some embodiments, the intent classifier component 520 may implement a machine learning (ML) model(s). Various machine learning techniques may be used to train and operate ML models. A ML model may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

At runtime, inputs to the intent classifier component 520 may include, for example, a dialog identifier of the present dialog, a user identifier (e.g., output by the user recognition component 395), the spoken natural language input data 505, and a dialog state (e.g., representing the presently executing functionality of the dialog management component 385, such as storytelling or question and answering).

In some embodiments, the dialog management component 385 may not include the intent classifier component 520. In such embodiments, even when the dialog management component 385 is in focus, the NLU component 360 may be used to determine an intent of the second spoken natural language input, and the second spoken natural language input data 505b may include NLU output data in addition to or instead of ASR output data.

In some embodiments, the dialog management component 385 may include a NER component (not illustrated). The NER component may process similarly to the NER component of the NLU component 360 described above. The NER component, of the dialog management component 385, may be configured to determine entity types and values corresponding to the dialog management component 385, and not necessarily all entity types and values determinable by the NER component of the NLU component 360. In some embodiments, the NER component, of the dialog management component 385, may implement a ML model.

The dialog history storage 530, of the dialog management component 385, may store various data of an ongoing dialog. For example, the dialog history storage 530 may associate a dialog identifier with the spoken natural language input data 505 of the dialog, the intent(s) determines for the natural language input(s) of the dialog, and the output data (e.g., performed actions, output content, etc.) output to the user as part of the dialog. The dialog history storage 530 may receive data from the orchestrator component 510, the intent classifier component 520, and the response management component 540. Similarly, the intent classifier component 520 may use dialog history data, stored in the dialog history storage 530 for the present dialog, to improve intent classification processing (i.e., to make it more likely that the intent determined by the intent classifier component 520 accurately represents the presently-being processing spoken natural language input). Likewise, the response management component 540 may use dialog history data, stored in the dialog history storage 530 for the present dialog, to improve processing performed by the response management component 540 (e.g., to make it more likely that the output of the response management component 540 is what the user 5 wants).

The response management component 540 is configured to generate output data for output to the user 5 via the device 110. For example, as described below with respect to FIGS. 6-7, the response management component 540 may generate output data including video data of a dynamic avatar, image data (e.g., corresponding to a page of a story), and audio data corresponding to synthesized speech. Inputs to the response management component 540 may include the spoken natural language input data 505, and more particularly ASR output data representing a spoken natural language input.

The Q&A component 550 is configured to output questions to the user 5 (e.g., questions regarding recently output story content) and answer questions of the user 5 represented in spoken natural language inputs. Details of the Q&A component 550 are described in detail herein below with respect to FIGS. 8-10.

The content management component 560 is configured to determine content for output to the user 5. In embodiments where the spoken natural language input requests output of a story, the content management component 560 may determine natural language data (e.g., natural language text data) corresponding to the story. In embodiments where the spoken natural language input requests menu information for a restaurant, the content management component 560 may determine natural language data corresponding to the menu information. In embodiments, where the spoken natural language input requests information for a product, the content management component 560 may determine natural language data corresponding to the product. Details of the content management component 560 are described in detail herein below with respect to FIG. 11.

Various components of the dialog management component 385 may query the profile storage 370 for profile data corresponding to the presently-being processing spoken natural language input. For example, the orchestrator component 510 and/or the content management component 560 may query the profile storage 370 for user and/or group profile data associated with a user and/or group identifier associated with the spoken natural language input data 505. The user identifier may be output by the user recognition component 395. The group identifier may be determined by determining the group identifier is associated with a device identifier corresponding to the device 110 that received the spoken natural language input. The profile data may include various information such as, for example, a user age, a geographic location, a language(s) spoken by the user 5, a story genre preference(s), a story character preference(s), etc.

Various components of the dialog management component 385 may query a content storage 570 for content data responsive to the presently-being processed spoken natural language input. For example, the content management component 560 may query the content storage 570 for content data based on the information included in the spoken natural language input (e.g., represented in the NLU output data). In embodiments where the content storage 570 stores story content, the content management component 560 may query the content storage 570 for content data corresponding to natural language data (e.g., text data) of a story. For example, one or more components, of the dialog management component 385 may perform an ElasticSearch of the content storage 570 using intent and entity data from the spoken natural language input. The results of the search may then be filtered and ranked based on content the user 5 has accessed to and/or subscribed to, based on past user interaction data, based on how relevant the content is to the intent and entity data (e.g., a number of times the entity is mentioned in the content), etc.

Various components of the dialog management component 385 may query a content storage 570 for content data responsive to the presently-being processed spoken natural language input. For example, the content management component 560 may query the content storage 570 for content data. In some embodiments, the content storage 570 may store story content (e.g., natural language data, such as natural language text data, corresponding to story content), with each story content being associated with one or more entities (e.g., a genre, character type(s), character name(s), etc.). In some embodiments, the content storage 570 may store location (e.g., museum) tour content. As an example, for a given museum, the content storage 570 may store images of artwork, each image being associated with one or more entities (e.g., artist name, artwork title, artwork type, etc.). In some embodiments, the content storage 570 may store restaurant content. As an example, for a given restaurant, the content storage 570 may store images of the restaurant and/or its menu, with each image being associated with one or more entities (e.g., front entrance, dining room, menu, hours, address, food type, etc.). In some embodiments, the content storage 570 may store shopping content. As an example, the content storage 570 may store images of items, with each image being associated with one or more entities (e.g., item description, price, seller, shipping information, etc.).

Various components of the dialog management component 385 may query a knowledge base 580 for data responsive to the presently-being processed spoken natural language input. For example, the Q&A component 550 may query the knowledge base 550 for data based on entity data of the spoken natural language input. In some embodiments, the knowledge base 580 may store data relating to stories (e.g., the stories represented in the content storage), with each story content being associated with, for example, a genre, character type(s), character name(s), etc. In some embodiments, the knowledge base 580 may store data relating to museums, with each museum being associated with, for example, an artist name, artwork title, artwork type, etc. In some embodiments, the knowledge base 580 may store data relating to restaurants, with each restaurant being associated with, for example, menu information, hours, address, food type, etc.). In some embodiments, the knowledge base 580 may store data relating to purchasable items, with each item being associated with, for example, an item description, price, seller, shipping information, etc.

Figure 6:
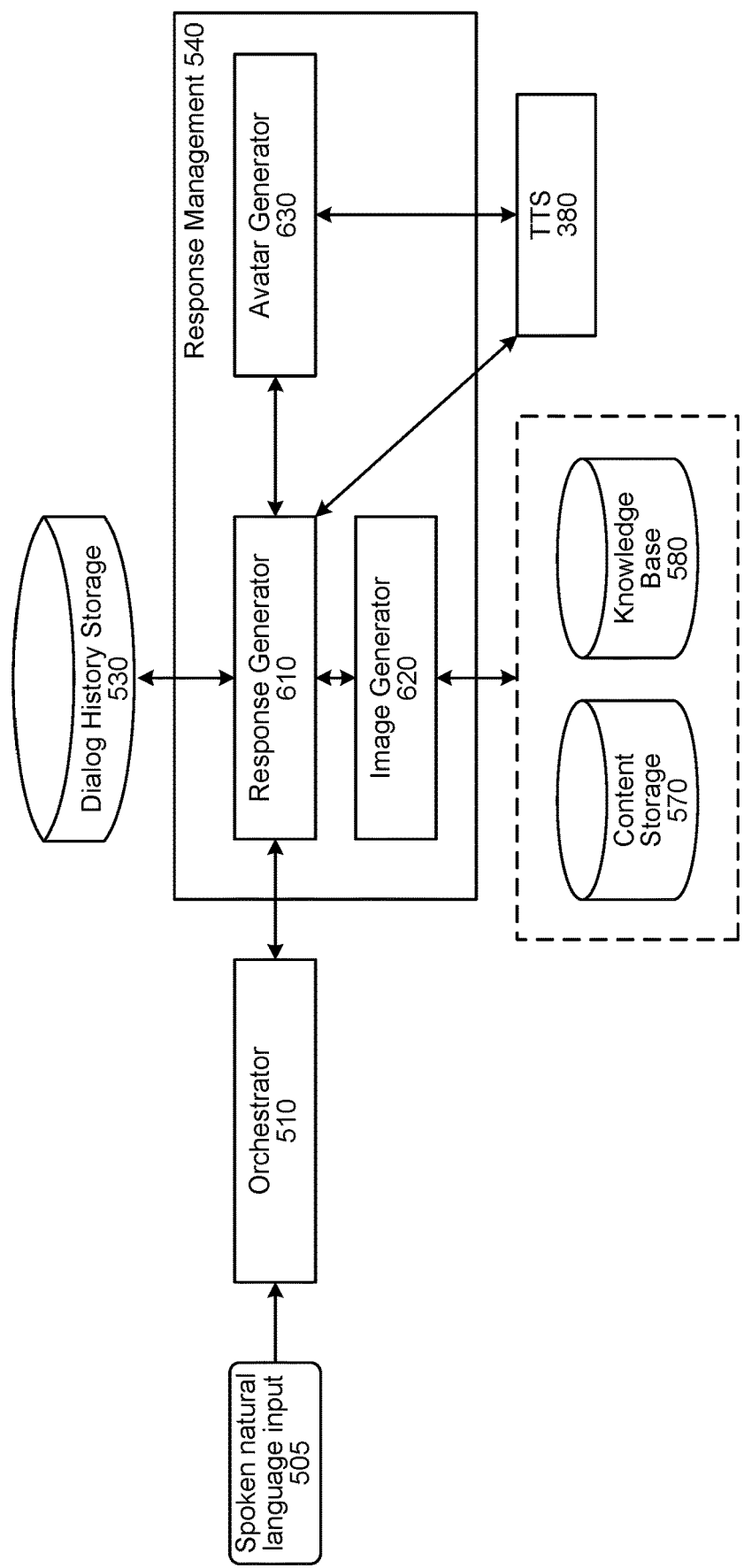
FIG. 6 is a conceptual diagram illustrating a response management component of the dialog management component, according to embodiments of the present disclosure.

Referring to FIG. 6, details of the response management component 540 are described. It is noted that the arrows in FIG. 6 represents which components may call which other components of the response management component 540, but the arrows do not necessary represent a runtime call sequence. The response management component 540 may include a response generator component 610, an image generator component 620, and an avatar generator component 630.

The response generator component 610 is configured to generate output data that synchronizes output of an avatar with synthesized speech (and optionally an image). The response generator component 610 may generate output video data and output audio data. The output video data may include a dynamic portion (e.g., including the avatar 230 and text 240) and a static portion (e.g., the image 220). The output audio data includes synthesized speech corresponding to the text 240. The response generator component 620 may generate the output video data and audio data to be commensurate in a time duration (i.e., a length of time of output of the video data corresponds to a length of time of output of the audio data). Thus, the device 110 may synchronize display of video and output of audio by commencing display of the video and output of the audio at the same time.

In some embodiments, the audio data, generated by the TTS component 380, may include start and end tokens of various portions (e.g., words, subwords, etc.) in the audio data. In such embodiments, the response generator component 620 may use the start and end tokens to generate animations of the avatar to coincide with the words/subwords in the TTS output audio data. For example, the response generator component 620 may generate output data such that (1) a beginning of a facial expression of the avatar corresponds with a first portion of synthesized speech corresponding to a start token of a word, subword, etc., and (2) an end of the facial expression corresponds with a second portion of the synthesized speech corresponding to an end token of the word, subword, etc.

The avatar generator component 630 is configured to generate video (or other) data including an avatar (e.g., a face, head portion, body, etc.) with facial (and optionally other body) expressions synchronized to a corresponding TTS output. In some embodiments, the response generator component 610 may send, to the avatar generator component 630, one or more of the natural language data generated by the response generator component 610, a language identifier corresponding to a language of the natural language data generated by the response generator component 610, an emotion identifier representing an emotion to be exhibited by the avatar in the video data, and/or a character identifier corresponding to a type of avatar (e.g., female or male, child or adult, etc.). In some embodiments, when generating the natural language data, the response generator component 610 may generate the natural language data to be associated with one or more particular emotions (e.g., happy, sad, surprised, disgusted, fearful, neutral, etc.). Each emotion may be associated with a respective emotion identifier. In some embodiments, the response generator component 610 may process, using a ML model, natural language (e.g., text) data input thereto to estimate an emotion from the natural language (e.g., text) data. The output of such a ML model may be a SSML tag corresponding to the estimated emotion. The ML model may be trained using natural language text data manually annotated to represent emotions thereof.

In some embodiments, natural language (e.g., text) data input to the response generator component 610 may already be associated with one or more SSML tags. For example, when a publisher of content (e.g., a story) causes natural language text data of the content to be stored in the content storage 570, the natural language text data may be associated with one or more SSML tags corresponding to one or more specific portions of the natural language text data.

A SSML tag of the present disclosure may indicate an emotion and/or a speaking style (e.g., prosody rate and/or pitch).

The avatar generator component 630 may communicate with a storage include seed images of avatars. Each image in the storage may be associated with a character identifier. The avatar generator component 630 may query the storage for a seed image corresponding to the character identifier received from the response generator component 610. In some embodiments, the seed image may be a two-dimensional (2D) seed image configured to be manipulated such that the avatar represented therein is able to blink and exhibit motion (e.g., head motion and lip movements). Art-known/industry-known 2D video targeting techniques may be used to render the 2D image into a video with the avatar appearing to speak the natural language data with appropriate emotion.

In some embodiments, the avatar generator component 630 may determine a seed three-dimensional (3D) model corresponding to the character identifier. Each sound, represented in the natural language data, may be associated with a respective emotion identifier, such that different sounds of the same natural language data may be exhibited using different emotions. The 3D model may determine a viseme (i.e., a facial image used to describe a particular sound) for each sound represented in the natural language data, and may map each viseme to a 3D blendshape (used to deform a 3D shape to show different expression) with an emotion corresponding to the emotion identifier of the respective sound. The 3D model may transition between blendshapes smoothly as the avatar transitions to speak the natural language data. The 3D model may be any art-known/industry-known 3D model configured to perform the foregoing processes.

In some embodiments, the response generator component 610 may send the natural language data to the TTS component 380, and the TTS component 380 may generate audio data including synthesized speech. In some embodiments, the natural language data may include one or more speech synthesis markup language (SSML) tags, with each SSML tag representing one or more emotions of a particular portion (e.g., word, subword, etc.) in the natural language data. In such embodiments, the TTS component 380 may generate audio data including synthesized speech with emotion(s) corresponding to the SSML tag(s).

The avatar generator component 630 may request the audio data from the TTS component 380, or the TTS component 380 may send the audio data to the avatar generator component 630 without receiving a request for same from the avatar generator component 630. In such instances, the 3D model may match the facial expression of the visemes and blendshapes discussed above to the synthesized speech in the audio data.

In some embodiments, the avatar generator component 630 may receive an indicator (e.g., from the response generator component 610) that the video of the avatar is to include subtitles/closed captions. In such embodiments, the avatar generator component 630 may use one or more art-known/industry-known techniques for configuring the video to include subtitles that uniquely indicator a word (e.g., via font manipulation, color manipulation, etc.) when the avatar is exhibiting an expression of the word. An example of data that may be input to the avatar generator component 630 is as follows:

```
{
  "session_id": "dlkjflk;hdjfkjd",
  "language": "English",
  "utterance_list":
  [
    {
      "text": "The bear said,",
      "emotion": "happy",
      "speaker": "narrator"
    },
    {
      "text": "Why not come and chat with me",
      "emotion": "angry",
      "speaker": "bear"
    }
  ]
}
```

The avatar generator component 630 may output a locator (e.g., a uniform resource locator (URL)) corresponding to the generated video data, timestamps (e.g., in milliseconds) indicating when the portion of the video starts in in the corresponding synthesized speech, a type (such as sentence, word, viseme, or SSML), a start (e.g., the offset of bytes, not characters) of the start of the object in the natural language data, an end (e.g., the offset of bytes, not characters) of the end of the object in the natural language data, and values (which will vary depending on the type of speech mark. An example of an output of the avatar generator component 630 is as follows:

```
{
  "animations":
  [
    {
      "url_avatar": "[url description].mp4",
      "speech_mark":
      [
        {"time":0,"type":"sentence","start":0,"end":46,"value":"The bear said"}
        {"time":62,"type":"word","start":0,"end":3,"value":"The"}
        {"time":62,"type":"viseme","value":"T"}
        {"time":125,"type":"viseme","value":"@"}
        {"time":237,"type":"word","start":4,"end":8,"value":"bear"}
        {"time":237,"type":"viseme","value":"p"}
        {"time":312,"type":"viseme","value":"E"}
        {"time":337,"type":"viseme","value":"r"}
        {"time":500,"type":"word","start":9,"end":13,"value":"said"}
        {"time":500,"type":"viseme","value":"s"}
        {"time":562,"type":"viseme","value":"E"}
        {"time":712,"type":"viseme","value":"t"}
        {"time":837,"type":"viseme","value":"sil"}
      ]
    }
  ]
}
```

The image generator component 620 is configured to generate an image for display to the user 5. In some embodiments, the image generator component 620 may access a storage of images and rank the images based on the natural language data generated by the response generator component 610. For example, a first encoder/ML model may process the entities in the natural language data to determine an embedding corresponding to the content generated by the response generator component 610, a second encoder/ML model may process text data (representing objects in images) to determine a respective embedding corresponding to different stored images, and the embeddings of the stored image objects may be compared to the embedding of the content. This same procedure can be used to produce audio effects such as sounds for background of a story scene.

In some embodiments, the image generator component 620 may implement a ML model (e.g., a neural network) that generates an image (and optionally one or more sound effects) based on the natural language (e.g., story content) data, generated by the response generator component 610, and associated metadata (e.g., story scene information). The ML model may be trained using images labeled with corresponding natural language story text. In some embodiments, data may be gathered by transfer style from realistic images from image captioning data (e.g., Conceptual Captioning, MS-COCO, etc.) into cartoon images. In some embodiments, the image generator component 620 may use one or more art-known/industry-known text-to-image generation techniques (e.g., ControlGAN, MirrorGAN, etc.) to generate a cartoon image based on the natural language text data generated by the response generator component 610.

In some embodiments, the image generator component 620 may generate all images for a story at the outset of the story being output to the user 5. In some embodiments, the image generator component 620 may generate an image of a page of a story as the page of the story is about to be output to the user 5.

Figure 7:
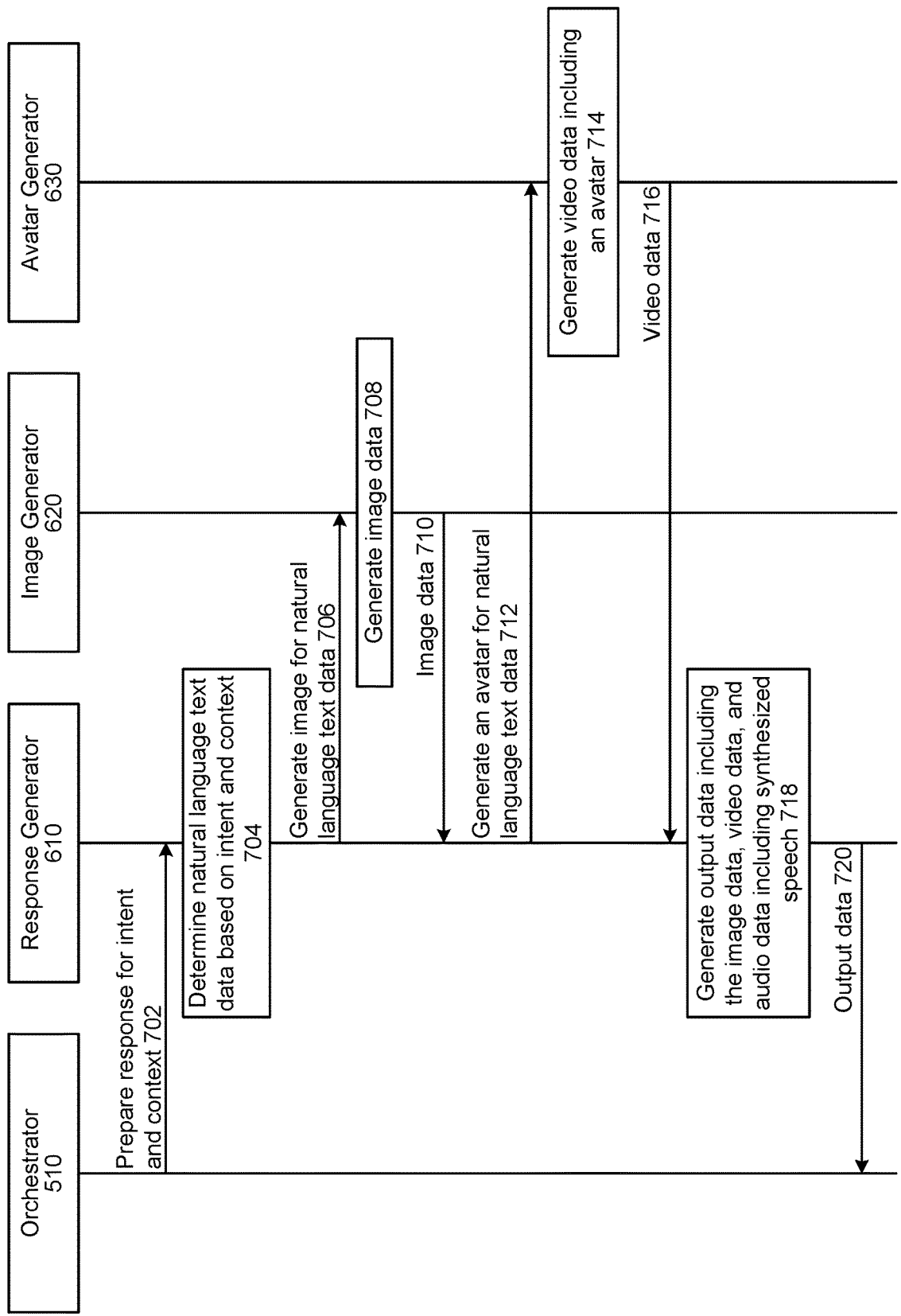
FIG. 7 is a signal flow diagram illustrating how components of the response management component may process at runtime, according to embodiments of the present disclosure.

FIG. 7 shows an example flow of how the components of the response management component 540 may process at runtime. The orchestrator component 510, of the dialog management component 385, sends (702), to the response generator component 610, a call to prepare a response for an intent, determined by the intent classifier component 520, and based on context. In some embodiments, the intent may be a <GenerateStory> intent and the context may be a user preference as to a preferred type of character (e.g., a preferred type of animal).

In response to the call, the response generator component 610 determines (704) natural language text data based on the intent and context. For example, the response generator component 610 may receive the natural language text data from the Q&A component 550 or the content management component 560, depending on the intent of the spoken natural language input. Details of how the Q&A component 550 and the content management component 560 may generate natural language text data are described elsewhere herein.

The response generator component 610 also sends (706), to the image generator component 620, a call to generate an image for the natural language text data. In response, the image generator component 620 generates (708) image data as described herein above, and sends (710) the image data to the response generator component 610.

The response generator component 610 also sends (712) to the avatar generator component 630, a call to generate an avatar for the natural language text data. In response, the avatar generator component 630 generates (714) video data, including an avatar, as described herein above, and sends (716) the video data to the response generator component 610.

Although FIG. 7 illustrates the image generator component 620 being called by the response generator component 610 prior to the avatar generator component 630, the present disclosure is not limited thereto. In some embodiments, the response generator component 610 may call the avatar generator component 630 prior to or substantially at the same time as calling the image generator component 620.

The response generator component 610 generates (718) output data including the image data, the video data, and audio data including synthesized speech corresponding to the natural language text data. Based on the teachings herein above, it will be appreciated that the output data may be configured such that the video and synthesized speech are output so it appears the avatar is speaking the synthesized speech as it is output. The response generator component 610 sends (720) the output data to the orchestrator component 510, which is configured to cause the device 110 to output the contents of the output data. For example, the output data may include a single stream of video data including a static image portion, a dynamic avatar portion, and audio corresponding to synthesized speech.

In some embodiments, when the response generator component 610 is implemented by the system 120, the system 120 may send an avatar model to the device 110. The avatar model may include animation parameters for the avatar. Thereafter, the response generator component 610 may send, to the device 110, output data including audio data with speech tags (such as start and end tokens) and avatar parameters. In such embodiments, the device 110 may be configured to generate the avatar dynamic video corresponding to the synthesized speech.

In some embodiments, when the intent, input to the response generator component 610, is a <RequestStory> intent, the response generator component 610 may query the content storage 570 for a story, and the content storage 570 may return the entire story to the response generator component 610. In some embodiments, the response from the content storage 570 may segment the story for presentment to the user as different portions. An example of the response from the content storage 570 is as follows:

```
{
  [
    {
      "text": "[natural language text of first portion of story]",
      "segment_index": 0,
      "speaker": "narrator",
      "emotion": "happy"
    },
    {
      "text": "[natural language text of second portion of story]",
      "segment_index": 1,
      "speaker": "narrator",
      "emotion": "happy"
    },
    {
      "text": "[natural language text of third portion of story]",
      Segment_index: 2,
      "speaker": "character",
      "emotion": "happy"
    }
  ]
}
```

In the foregoing example, the response generator component 610 may be configured each segment as a different output data in conjunction with the image generator component 620 and the avatar generator component 630 as described herein above.

Figure 8:
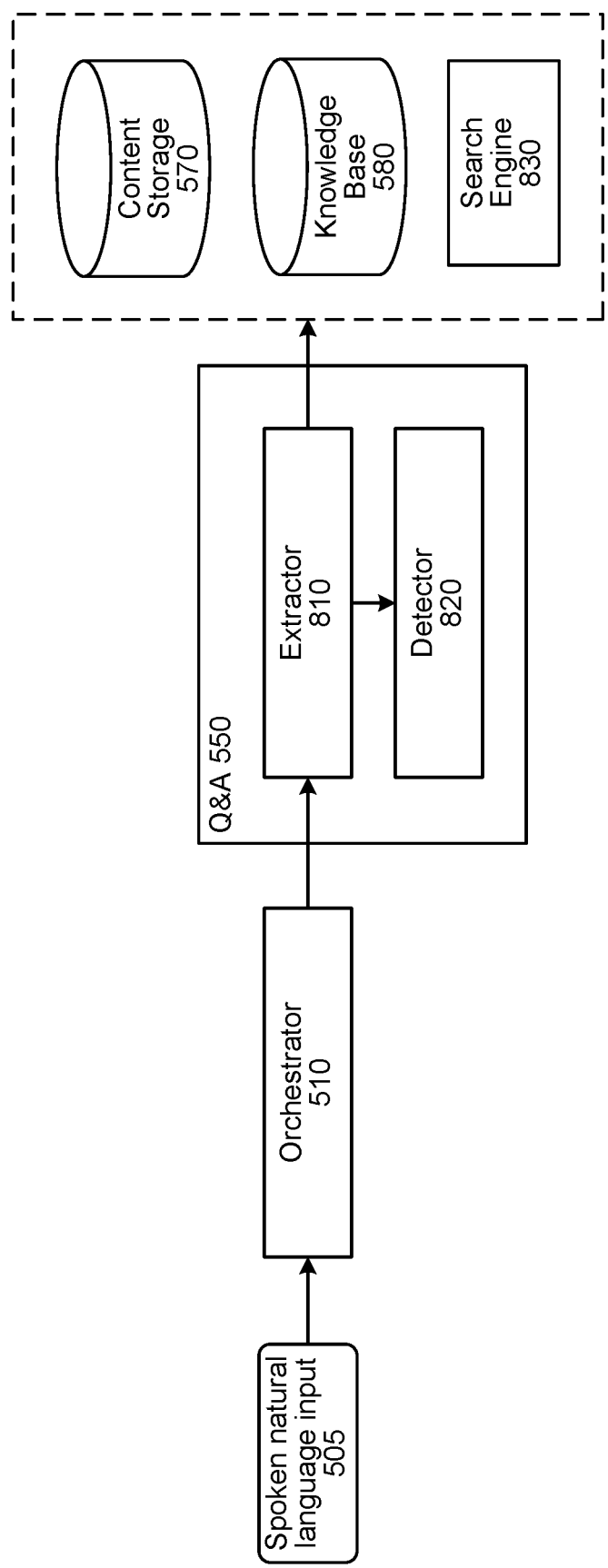
FIG. 8 is a conceptual diagram illustrating a question and answering (Q&A) component of the dialog management component, according to embodiments of the present disclosure.

Referring to FIG. 8, components of the Q&A component are described. The Q&A component is configured to determine relevant questions and answers to questions to be included in the output data generated by the response management component 540. The Q&A component may include an extractor component 810 and a detector component 820.

The user 5 may interrupt the output of content (e.g., a story) at any time to ask a question. When the spoken natural language input data 505 represents a spoken natural language input including a question, the detector component 820 is configured to determine a type of the question. As an example, when the system is outputting a story to the user 5 about a wolf and the spoken natural language input is "what did the wolf want for dinner," the detector component 820 may determine the spoken natural language input corresponds to an "in-context" question type, meaning the spoken natural language input is asking a question that may be answered using the content (e.g., story) being output to the user 5. As another example, when the system is outputting a story to the user 5 about a wolf and the spoken natural language input is "how many types of wolf are in the world," the detector component 820 may determine the spoken natural language input corresponds to an "out-context" question type, meaning the spoken natural language input is asking a question that may not be answered using the content (e.g., story) being output to the user 5. As a further example, when the system is outputting a story to the user 5 about a wolf and the spoken natural language input is "did the wolf eat the lamb," the detector component 820 may determine the spoken natural language input corresponds to a "both" question type, meaning the spoken natural language input is asking a question that may or may not be answered using the content (e.g., story) being output to the user 5.

In some embodiments, the detector component 820 may be a trained classifier trained using annotated data.

The extractor component 810 is configured to determine an answer to the question based on the spoken natural language input and the question type determined by the detector component 820. The extractor component 810 may selectively communicate with the content storage 570, the knowledge base 580, and/or a search engine 830 to determine an answer based on the question type.

When the question corresponds to the in-context question type, the extractor component 810 may determine an answer to the question using content (e.g., the story being output to the user 5) as stored in the content storage 570. In some embodiments, the extractor component 810 may implement a machine learning model to determine the answer. Inputs to the machine learning model may include the question posed by the user 5, the content (e.g., story) being output, the question type, and data in the knowledge base 580 and/or output by the search engine 830.

When the question corresponds to the out-context question type, the extractor component 810 may determine an answer to the question using content in the knowledge base 580 and/or a search engine 830. The knowledge base 580 may include a collection of tuples or otherwise semantically (or otherwise) encoded data that can be queried to obtain information. In such a knowledge base 580, certain knowledge bases or information stores may store information in a "tuple" format, where entities are joined together in pairs, triplets, or the like, that define the relationship between two things. For example, a tuple such as [John Doe, husband of, Jane Doe] may describe that John Doe is Jane Doe's husband. Many such tuples may exist in a knowledge base and may be usable to answer user inputs. For example, the above tuple may be used to answer a user input such as "who is Jane Doe's husband," "who is John Doe married to," or the like. One example of the knowledge base 580 is Amazon's EVI knowledge base. The extractor component 810 may query the knowledge base 580 with respect to entities in the spoken natural language input data 505.

Instead of using the knowledge base 580 to determine an answer, or at least partially in parallel to the knowledge base 580 being queried, the extractor component 810 may operate call a search engine 830 to attempt to find an answer to the question. In some embodiments, the search engine 830 may use an unstructured web search (e.g., to search tings such as an internet encyclopedia, news websites, public social media feeds, etc.), and the result for the web search may take the form of a list of Internet links.

When the detector component 820 determines the question corresponds to the both question type, the extractor component 810 may query the content storage 570 and query the knowledge base 580 and/or call the search engine 830 as detailed above.

Figure 9:
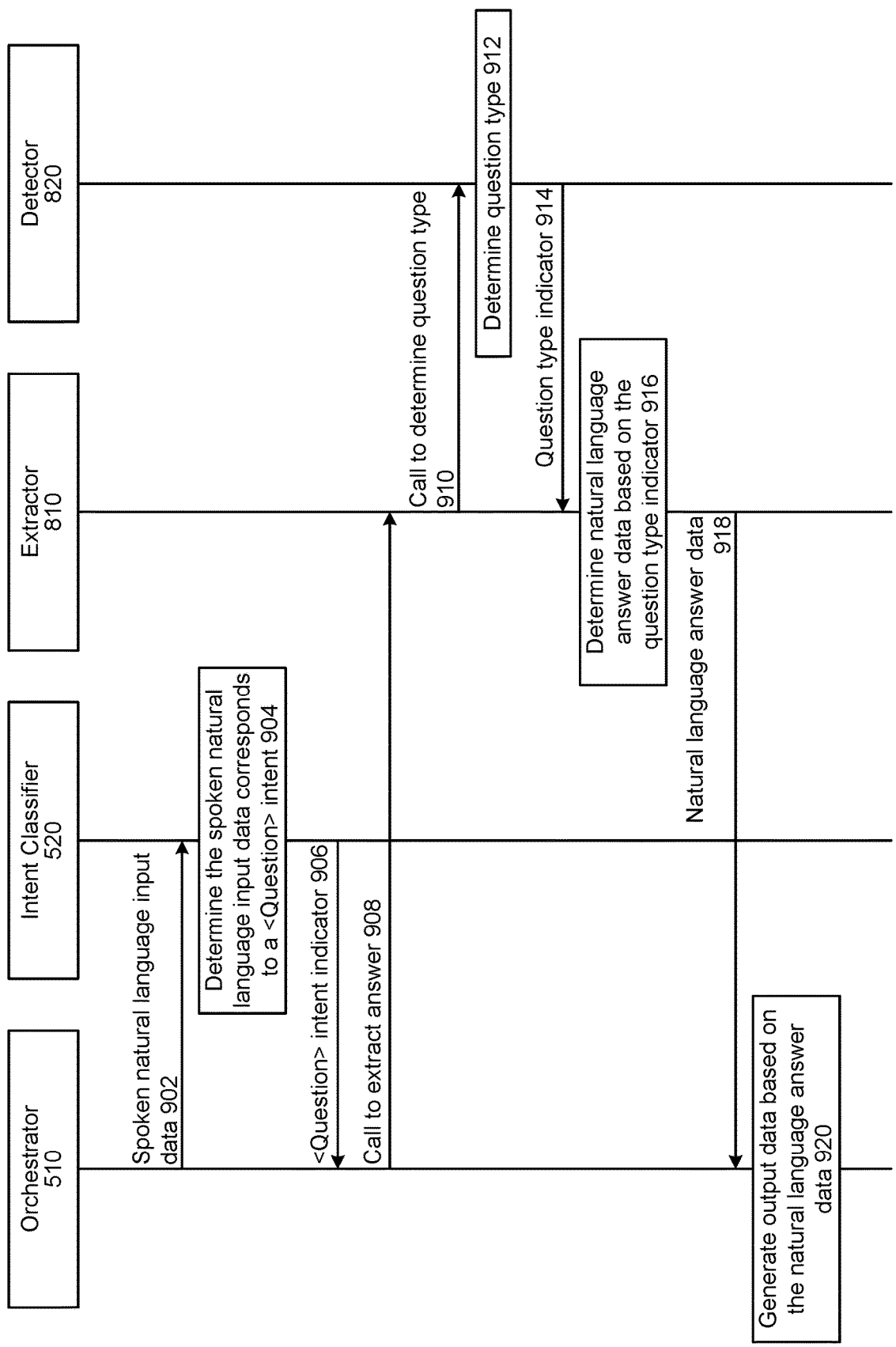
FIG. 9 is a signal flow diagram illustrating how components of the Q&A component may process at runtime to answer a user's question, according to embodiments of the present disclosure.

FIG. 9 shows an example flow of how the components of the Q&A component 550 may process at runtime in response to a user question. When the orchestrator component 510 receives spoken natural language input data 505, the orchestrator component 510 may send (902) the spoken natural language input data 505 to the intent classifier component 520 of the dialog management component 385. The intent classifier component 520 may determine (904) the spoken natural language input data 505 corresponds to a <Question> intent, and may send (906) a <Question> intent indicator to the orchestrator component 510.

Based on receiving the question intent indicator, the orchestrator component 510 may send (908) a call to the extractor component 810 to extract an answer to the question. The call may include the spoken natural language input data 505 and, optionally, the <Question> intent indicator. In some embodiments, the dialog management component 385 may implement a component that performs NER processing on the spoken natural language input data 505 to determine one or more entity types and values represented therein. In such embodiments, the orchestrator component 510 may send, to the extractor component 810, data representing the entity type(s) and value(s).

After being called by the orchestrator component 510, the extractor component 810 may send (910) a call to the detector component 820 to determine a question type of the question in the spoken natural language input data 505. As part of the call, the extractor component 810 may send the spoken natural language input data 505 to the detector component 820. The detector component 820 processes, as described herein above, to determine (912) a question type, and sends (914) a corresponding question type indicator to the extractor component 810. Each question type may be associated with a respective question type indicator, such as "in-content," "out-context," or "both."

The extractor component 810 may thereafter process as described herein above to determine (916) an answer based on the question type indicator and the spoken natural language input data 505 (and more particularly the entity type(s) and value(s) represented in the spoken natural language input). For example, the extractor component 810 may receive structured, non-natural language data corresponding to the answer from the content storage 570, the knowledge base 580, and/or the search engine 830. The extractor component 810 may process the structured data using one or more art-known/industry-known natural language generation techniques to generate natural language answer data corresponding to a natural language answer to the question. In some embodiments, the natural language answer data may be natural language text data. The extractor component 810 may send (918) the natural language answer data to the orchestrator component 510.

The orchestrator component 510 may generate (920) output data based on the natural language answer data. For example, the orchestrator component 510 may send the natural language output data to the response management component 540. The response management component 540 may execute the response generator component 610 and the avatar generator component 630, as described herein above, to generate output data including audio data, including synthesized speech corresponding to the natural language output data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

Figure 10:
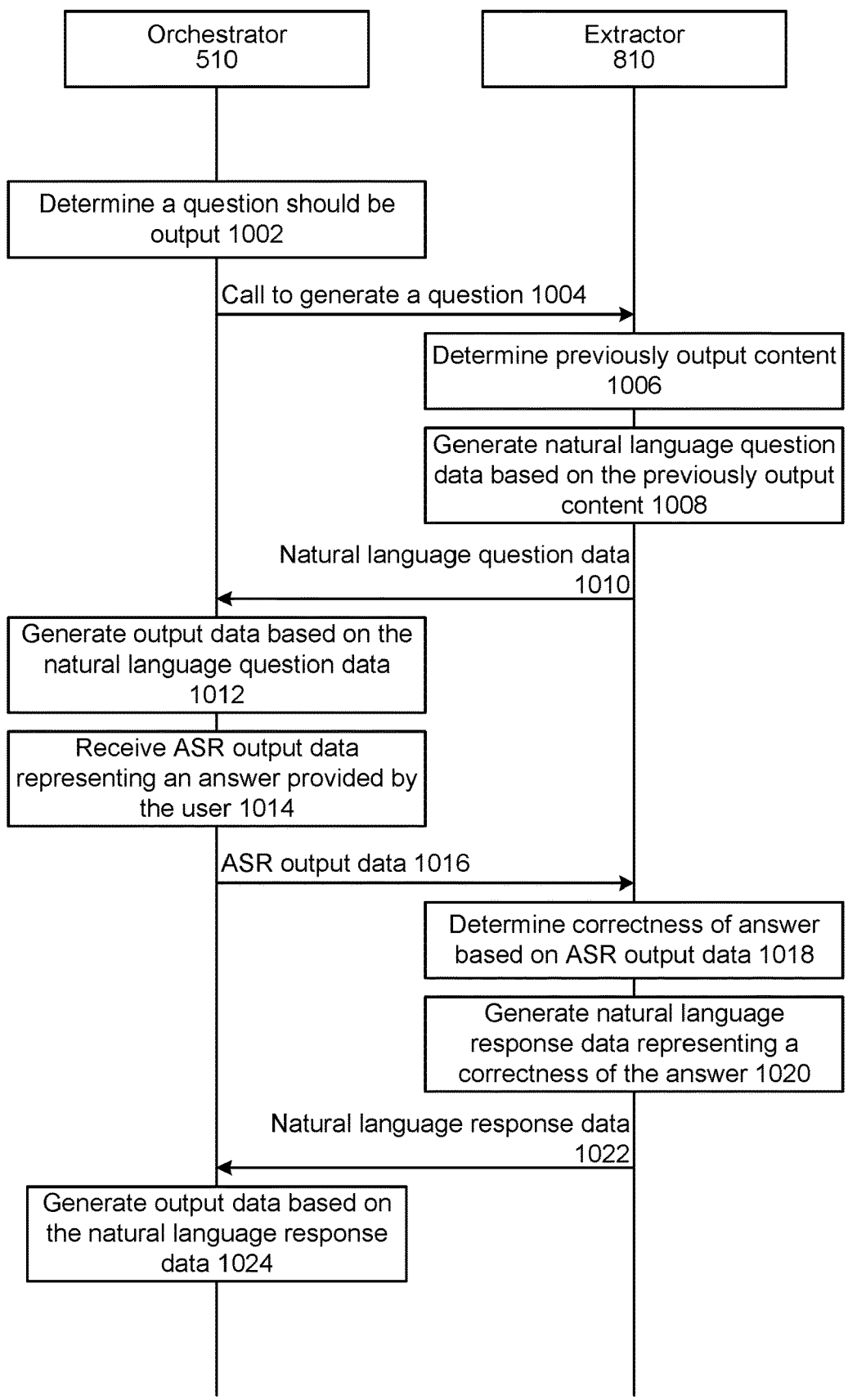
FIG. 10 is a signal flow diagram illustrating how components of the Q&A component may process at runtime to generate a question for output to the user, according to embodiments of the present disclosure.

In some embodiments, the Q&A component may be configured to proactively output questions to the user 5. For example, when a story is being output to the user 5, the Q&A component 550 may be configured to ask the user 5 questions about the story. FIG. 10 illustrates runtime process that may be performed to generate a question for output to the user 5.

The orchestrator component 510 may determine (1002) a question should be output to the user 5. For example, the orchestrator component 510 may determine the question should be output based on determining the device 110 has finished outputting content (e.g., a story page) of output data. In response to such a determination, the orchestrator component 510 may send (1004) a call to the extractor component 810 to generate a question.

In response to the call, the extractor component 810 may determine (1006) previously output content of the present dialog. For example, the extractor component 810 may query (e.g., via the orchestrator component 510) the dialog history storage 530 for natural language content that was output and is associated with a dialog identifier of a presently ongoing dialog. In some embodiments, the extractor component 810 may query the dialog history storage 530 for only the most recent output natural language content.

The extractor component 810 may generate (1008) natural language question data based on the previously output content, with the natural language question data representing a natural language question. The extractor component 810 may use one or more art-known/industry-known natural language generation techniques to generate the natural language question data.

The extractor component 810 may process the previously output content to extract one or more entities and corresponding context therein. The extractor component 810 may generate various types of questions based on the entity/entities and context. Example question types include "what" questions, "who" questions, "why" questions, "when" questions, "which" questions, "where" questions, and "how" questions. As an example, the previously output content may correspond to "One summer's day, two bears were sleeping in the park to relax. A squirrel passed by carrying corn." Based on this previously output content, the extractor component 810 may generate a "what" question of "what did the squirrel carry," a "who" question of "what animal passed by," a "why" question of "why were the bears sleeping in the park," a "when" question of "when were the bears sleeping in the park," a "which" question of "which animal passed by," a "where" question of "where were the bears sleeping," or a "how" question of "how many bears were sleeping in the park on a summer day."

The extractor component 810 may send (1010) the natural language question data to the orchestrator component 510, and the orchestrator component 510 may generate (1012) output data based on the natural language question data. For example, the orchestrator component 510 may send the natural language question data to the response management component 540. The response management component 540 may execute the response generator component 610 and the avatar generator component 630, as described herein above, to generate output data including audio data, including synthesized speech corresponding to the natural language question data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

After outputting the output data, the device 110 may receive a further spoken natural language input from the user 5, with the further spoken natural language input corresponding to an answer to the output question. The ASR component 350 may process audio data, of the spoken natural language input, to determine ASR output data. The orchestrator component 510 may receive (1014) the ASR output data, and may send (1016) the ASR output data to the extractor component 810.

The extractor component 810 may determine (1018) a correctness of the answer, provided by the user 5, based on the ASR output data. When generating the natural language question data, the extractor component 810 may also generate natural language answer data. For example, for the natural language question data "what did the squirrel carry," the extractor component 810 may generate natural language answer data of "corn." For further example, for the natural language question data "what animal passed by," the extractor component 810 may generate natural language answer data of "a squirrel." In another example, for the natural language question data "why were the bears sleeping in the park," the extractor component 810 may generate natural language answer data of "to relax." For further example, for the natural language question data "when were the bear's sleeping in the park," the extractor component 810 may generate natural language answer data of "on summer's day." In another example, for the natural language question data "which animal passed by," the extractor component 810 may generate natural language answer data of "a squirrel." For further example, for the natural language question data "where were the bears sleeping," the extractor component 810 may generate natural language answer data of "in the park." In another example, for the natural language question data "how many bears were sleeping in the park on a summer day," the extractor component 810 may generate natural language answer data of "two."

The extractor component 810 may determine the correctness of the answer using various techniques. In some embodiments, the extractor component 810 may compare the ASR output data (which may be represented in text or as tokens) against text or tokens corresponding to the natural language answer data. The extractor component 810 may generate a score (e.g., a confidence score) based on the comparison. In some embodiments, the score may be configured within a range (e.g., 0 to 1), with 0 representing no confidence that the user-provided answer is correct and 1 representing 100% confidence that the user-provided answer is correct. In some embodiments, the extractor component 810 may determine the user-provided answer is correct when the generated score (e.g., confidence score) satisfies a condition (e.g., a threshold score, or threshold confidence score).

The extractor component 810 may generate (1020) natural language response data. For example, if the score satisfies the condition, the natural language response data may correspond to "that's correct, good job" or the like. For further example, if the score does not satisfy the condition, the natural language response data may correspond to "darn, that's incorrect, the correct answer was [correct answer]" or the like. The extractor component 810 may send (1022) the natural language response data to the orchestrator component 510.

The orchestrator component 510 may generate (1024) output data based on the natural language response data. For example, the orchestrator component 510 may send the natural language response data to the response management component 540. The response management component 540 may execute the response generator component 610 and the avatar generator component 630, as described herein above, to generate output data including audio data, including synthesized speech corresponding to the natural language response data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

Figure 11:
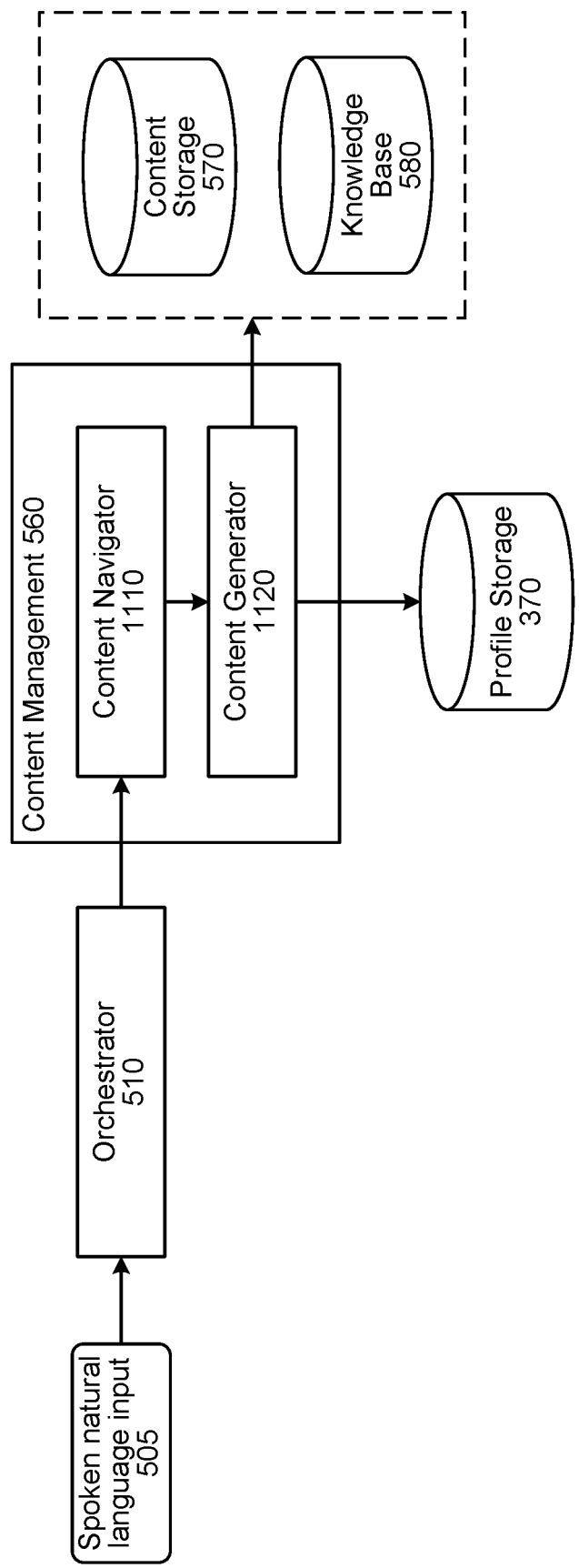
FIG. 11 is a conceptual diagram illustrating a content management component of the dialog management component, according to embodiments of the present disclosure.

Referring to FIG. 11, the content management component 560, of the dialog management component 385, is described. The content management component 560 may include a content navigator component 1110 and a content generator component 1120.

The content navigator component 1110 is configured to track portions of content (e.g., a most recent output portion of a story) that have been output as part of the ongoing dialog. The content navigator component 1110 facilitates semantic navigation of content. For example, the content navigator component 1110 may facilitate semantic navigation of a story, such as going to a scene where the "bear was sleeping," "beginning of story," "end of story," etc. The content navigator component 1110 may send data, to the content generator component 1120, representing what portion of content (e.g., what page of a story) the content generator component 1120 should generate for output.

The content generator component 1120 is configured to generate natural language data for output. For example, the content generator component 1120 may determine natural language story data in response to a spoken natural language input requesting a story be output (e.g., corresponding to an <OutputStory> intent). In some embodiments, the content generator component 1120 may query the content storage 570 for natural language data (e.g., natural language story data) stored therein. In the example where the spoken natural language input requestes a story be output, the story generator component 1120 may query the content storage 570 for the natural language text of a first page of a story.

In some embodiments, the content generator component 1120 may generate updated natural language data (e.g., updated natural language story text) based on one or more user preferences. In some embodiments, the content generator component 1120 may determine a user, group, and/or device identifier(s) corresponding to the spoken natural language input, and may query the profile storage 370 for one or more content preferences associated with the user, group, and/or device identifier. For example, the content preference may include a preferred type of character (e.g., a type of animal), a preferred story plot, a preferred scene location, etc. In some embodiments, the content generator component 1120 may engage the user 5 in one or more dialog turns to obtain one or more preferences from the user at runtime.

The content generator component 1120 may generate the updated natural language data by performing one or more art-known/industry-known natural language generation techniques on the original natural language data and with respect to the user preference(s). For example, the original natural language data may correspond to a story in which a bear hunts for food, and the user preference may indicate bear should hibernate. Based on such, the content generator component 1120 may use one or more art-known/industry-known natural language generation techniques to generate updated natural language data corresponding to a story in which the bear hibernates instead of hunts. In some embodiments, such processing may involve the content generator component 1120 replacing one or more text sections, in the natural language data, with one or more updated text sections.

In some embodiments, the content generator component 1120 may implement a neural network machine learning model. The neural network may be configured to determine when inputs of the user desire a plot of a story content to be changed. The neural network may be trained using training samples, where a training sample including text of a story, one or more example user inputs for adjusting the text, and the correctly updated text. As such, the trained neural network may be configured to generate a story based on a plot and one or more parameters. In some embodiments, the content generator component 1120 may implement an art-known/industry-known machine learning model, such as GPT-2, configured to generate text (e.g., generate a story from a plot).

In some embodiments, the content generator component 1120 may receive, from the content storage 570, natural language data corresponding to an entire story, and the content generator component 1120 may update the entire story based on the user preference(s) and/or a parameter(s) included in the spoken natural language input. In some embodiments, the content generator component 1120 may receive, from the content storage 570, natural language data corresponding to a single page of a story, and the content generator component 1120 may update the page of the story based on the user preference(s). In this example, when the system is done outputting the page to the user 5, the content generator component 1120 may query the content storage 570 for a next page of natural language data associated with the same content identifier (e.g., story identifier), and may then update that next page based on the user preference(s). As such, the content generator component 1120, in some embodiments, may generate updated natural language data as the portion of the content (e.g., page of the book) is to be output.

Inputs to the content generator component 1120 may include the dialog identifier of the present dialog, data representing a present dialog state, and data representing a maximum number of tokens that the (updated) natural language data (output by the content generator component 1120) should correspond to. Different models have different tokenization methods (such as subword tokenization), and thus the maximum number of tokens may be configured based on the model(s) implemented by the content generator component 1120. Output of the content generator component 1120 may include the (updated) natural language data having a number of tokens no larger than the maximum number of tokens represented in the input to the content generator component 1120.

In some embodiments, the content generator component 1120 may generate natural language data based on a user preference(s) without querying the content storage 570 for content. For example, the content generator component 1120 may determine user preferences for characters, plot, and scene location, and may use a ML model to generate natural language text of a story therefrom. For example, the user preferences (and/or a user input) may indicate a first character, stored story content may include a second character, and the content generator component 1120 may use the ML model to generate natural language text including the first character instead of the second character.

Various components of the dialog management component 385 may receive a dialog state as input. Such enables the various components to coordinate portions of a system output of a dialog.

FIG. 12 is a signal flow diagram illustrating processing that may be performed in response to a <Conversation> intent, according to embodiments of the present disclosure. Upon receiving the spoken natural language input data 505, the orchestrator component 510 may send (1202) a call to the intent classifier component 520 to classify an intent of the spoken natural language input. The call may include ASR output data represented in the spoken natural language input data 505.

The intent classifier component 520 may process the ASR output data, as described herein above, to determine (1204) the spoken natural language input corresponds to a <Conversation> intent. For example, the response generator component 610 may initially determine output data corresponding to "Hello [user name]! How are you doing?", and the user may respond with "Hello! I am doing fine. Thank you." In this example, the intent classifier component 520 may determine the user's response to correspond to the <Conversation> intent as the user's response may be classified as mere banter. The intent classifier component 520 sends (1206) a <Conversation> intent indicator to the orchestrator component 510.

In response to receiving the <Conversation> intent indicator, the orchestrator component 510 may send (1208), to the response generator component 610, a call to prepare a response for the <Conversation> intent and a dialog history of the present dialog. The call may include the ASR output data and the <Conversation> intent indicator.

The response generator component 610 may process, as described herein above, to generate (1210) output data based on the <Conversation> intent indicator and the dialog history of the present dialog. For example, the output data may correspond to "what is your plan for this weekend." Thus, like the spoken natural language user input, the output data may be characterized as mere banter. The response generator component 610 sends (1212) the output data to the orchestrator component 510.

The orchestrator component 510, in turn, outputs (1214) the output data. For example, the output data may include audio data, including synthesized speech corresponding to the natural language output data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

The dialog management component 385 may process as described above, with respect to FIG. 12, with respect to multiple spoken natural language inputs to generate multiple corresponding outputs such that the dialog management component 385 may engage the user 5 in an idle multi-turn conversation (i.e., one not intended to cause content (e.g., a story, museum information, etc.) to be output).

Figure 13B:
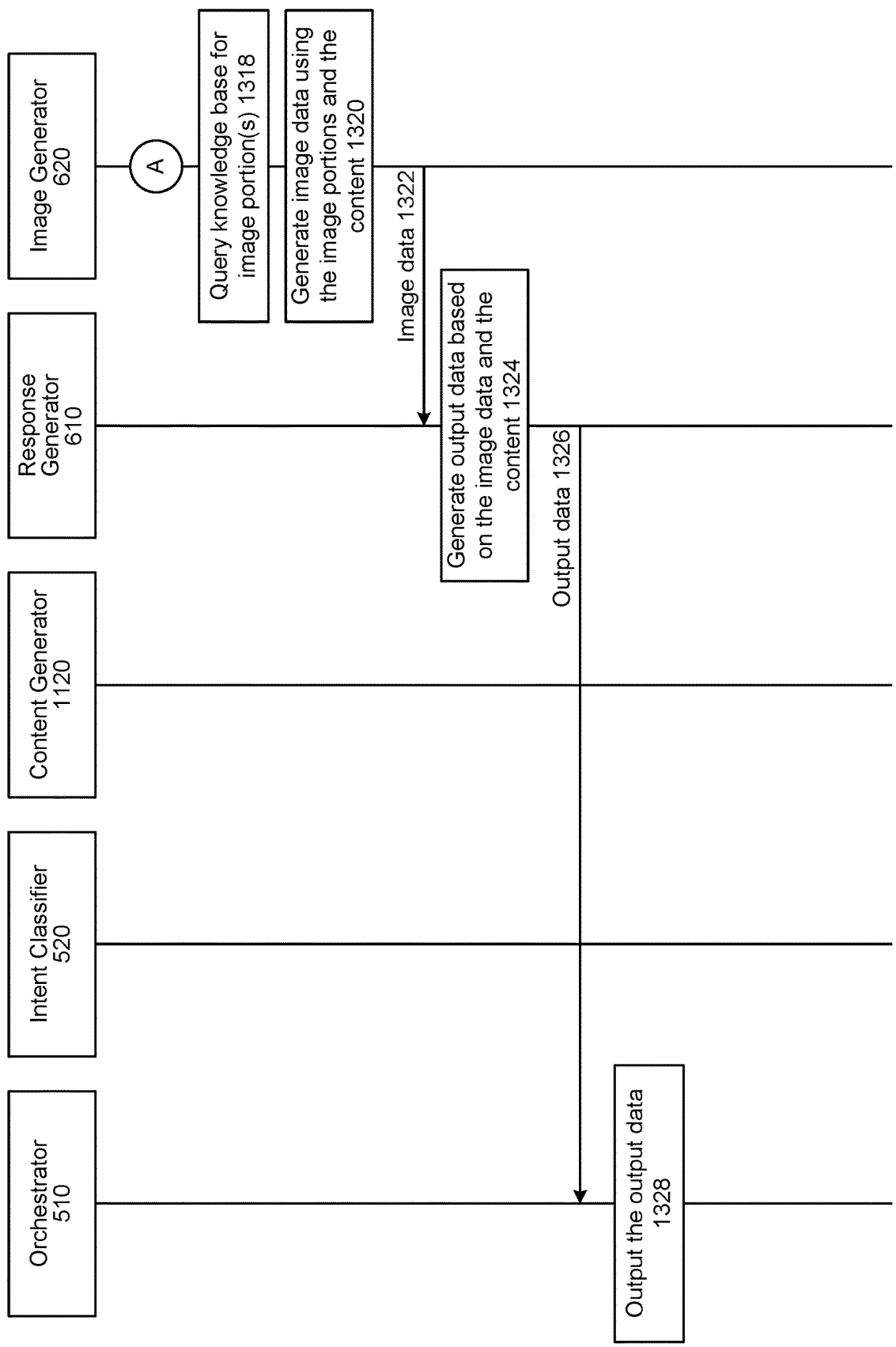

As part of the idle conversation, the response generator component 610 may generate output data asking the user 5 if the user wants content (e.g., a story) output. For example, such output data may correspond to "are you in the mood for [content description]" or the like. In response, the user 5 may provide a spoken natural language input indicating the user 5 is interested in having content output. FIGS. 13A-13B are a signal flow diagram illustrating processing of the dialog management component 385 in response to such a spoken natural language input.

Upon receiving the spoken natural language input data 505, the orchestrator component 510 may send (1202) a call to the intent classifier component 520 to classify an intent of the spoken natural language input. The call may include ASR output data represented in the spoken natural language input data 505.

The intent classifier component 520 may process the ASR output data, as described herein above, to determine (1302) the spoken natural language input corresponds to a <RequestContent> intent. For example, the response generator component 610 may initially determine output data corresponding to "Are you in the mood for [content description]," and the user may respond with "Yes" or the like. The intent classifier component 520 sends (1304) a <RequestContent> intent indicator to the orchestrator component 510.

In response to receiving the <RequestContent> intent indicator, the orchestrator component 510 may send (1306), to the content generator component 1120, a call to get content for output to the user 5. The content generator component 1120, in turn, may query (1308) the profile storage 370 for a user/group preference(s) (e.g., a preferred character type, scene, etc.). Alternatively, the dialog management component 385 may engage the user 5 in one or more turns of a dialog to obtain the user's preference(s) at runtime. The content generator component 1120 may query (1310) the content storage 570 for content corresponding to the user/group preference(s). For example, the content may be a story having a character type(s) and/or scene as represented in the user/group preference(s).

The content generator component 1120 may send (1312) the content to the orchestrator component 510, which may in turn send (1314), to the response generator component 610, a call to prepare a response based on the content. For example, the call may include the <RequestContent> indicator and the content.

The response generator component 610 may send (1316), to the image generator component 620, a call to generate an image based on the content. For example, the call may include content natural language data from which the image generator component 620 is to generate an image.

The image generator component 620 may query (1318) the knowledge base 580 for one or more image portions corresponding to the content. For example, the image generator component 620 may query the knowledge base 580 for stock images of character types (e.g., animals) included in the content. The image generator component 620 may process, as described herein above, to generate (1320) image data representing the content (and using the image portion(s) to the extent same exists). The image generator component 620 may send (1322) the image data to the response generator component 610.

The response generator component 610 may in turn process, as described herein above, to generate (1324) output data based on the image data and the content. The response generator component 610 sends (1326) the output data to the orchestrator component 510.

The orchestrator component 510, in turn, outputs (1328) the output data. For example, the output data may include audio data, including synthesized speech corresponding to the content, the image data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

In some instances, a user may request content be output based on one or more user preferences such that content needs to be generated at runtime. FIGS. 14A-14C are a signal flow diagram illustrating processing of the dialog management component 385 to generate content at runtime.

Upon receiving first spoken natural language input data 505*a*, the orchestrator component 510 may send (1202) a call to the intent classifier component 520 to classify an intent of the first spoken natural language input. The call may include ASR output data represented in the first spoken natural language input data 505*a*.

The intent classifier component 520 may process the ASR output data, as described herein above, to determine (1402) the first spoken natural language input corresponds to a <GenerateContent> intent and indicates a type of non-preferred content. For example, such a first spoken natural language input may correspond to "tell me a story, and I do not like [character type]." The intent classifier component 520 may send (1404), to the orchestrator component 510, a <GenerateContent> indicator and data representing the non-preferred content.

In response to receiving the <RequestContent> intent indicator and the data representing the non-preferred content, the orchestrator component 510 may update (1406) a user/group preference in the profile storage 370. For example, the orchestrator component 510 may determine a user and/or group identifier corresponding to the first spoken natural language input, and may update user and/or group profile data corresponding thereto to indicate the non-preferred content.

After updating the user/group preference, the dialog management component 385 may output data asking the user 5 what type of content (e.g., character type) the user does like. In response, the device 110 may receive a second spoken natural language input indicating the character type, and second spoken natural language input data 505*b*, corresponding to the second spoken natural language input, may be sent to the orchestrator component 510.

Upon receiving second spoken natural language input data 505*b*, the orchestrator component 510 may send (1408) a call to the intent classifier component 520 to classify an intent of the second spoken natural language input. The call may include ASR output data represented in the second spoken natural language input data 505*b*.

The intent classifier component 520 may process the ASR output data, as described herein above, to determine (1410) the second spoken natural language input corresponds to the <GenerateContent> intent and indicates a type of preferred content. For example, such a first spoken natural language input may correspond to "I like [character type]." The intent classifier component 520 may send (1412), to the orchestrator component 510, a <GenerateContent> indicator and data representing the preferred content.

In response to receiving the <GenerateContent> intent indicator and the data representing the preferred content, the orchestrator component 510 may send (1414), to the content generator component 1120, a call to get content. The call may include the <GenerateContent> intent indicator and the preferred content.

The content generator component 1120 in turn may query (1416) the content storage 570 for content that can be updated using the preferred content (e.g., character type) indicated by the user 5. For example, the content generator component 1120 may receive a story identifier corresponding to a story that can be updated using the preferred content character type indicated by the user 5. The content generator component 1120 may send (1418) a content identifier (e.g., a story identifier) to the orchestrator component 510.

In response, the orchestrator component 510 may send (1420), to the content navigator component 1110, a call to get a first content segment. The call may include the content identifier.

In response to receiving the call, the content navigator component 1110 may send (1422), to the content generator component 1120, a request for the first content segment. In response, the content generator component 1120 may determine (1424) the first content segment. For example, the request may include the content identifier, and the content generator component 1120 may determine a first segment (e.g., page) corresponding to the content identifier (e.g., story identifier), and may perform processing as described herein above (e.g., using natural language generation processing) to generate first content segment data corresponding to the first segment updated based on the user preference indicated by the user 5 at runtime. For example, the second spoken natural language input may indicate a first character, the content generator component 1120 may determine a first story segment including a second character, and the content generator component 1120 may generate the first content segment data corresponding to the first story segment updated to include the first character instead of the second character. In some embodiments, the first content segment data may include natural language content (e.g., a natural language portion of a story).

The content generator component 1120 may send (1426) the first content segment data to the content navigator component 1110, which may send (1428) the first content segment data to the orchestrator component 510. The orchestrator component 510 may in turn send (1430), to the response generator component 610, a call to prepare a response based on the first content segment data.

The response generator component 610 may cause (1432) the image generator component 620 to generate image data, as described herein, for the first content segment data (which may be natural language text data corresponding to the first content segment). The response generator component 610 may process, as described herein above, to generate (1434) output data based on the image data and the first content segment data. The response generator component 610 sends (1436) the output data to the orchestrator component 510.

The orchestrator component 510, in turn, outputs (1438) the output data. For example, the output data may include audio data, including synthesized speech corresponding to the first content segment, the image data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

Figure 15A:
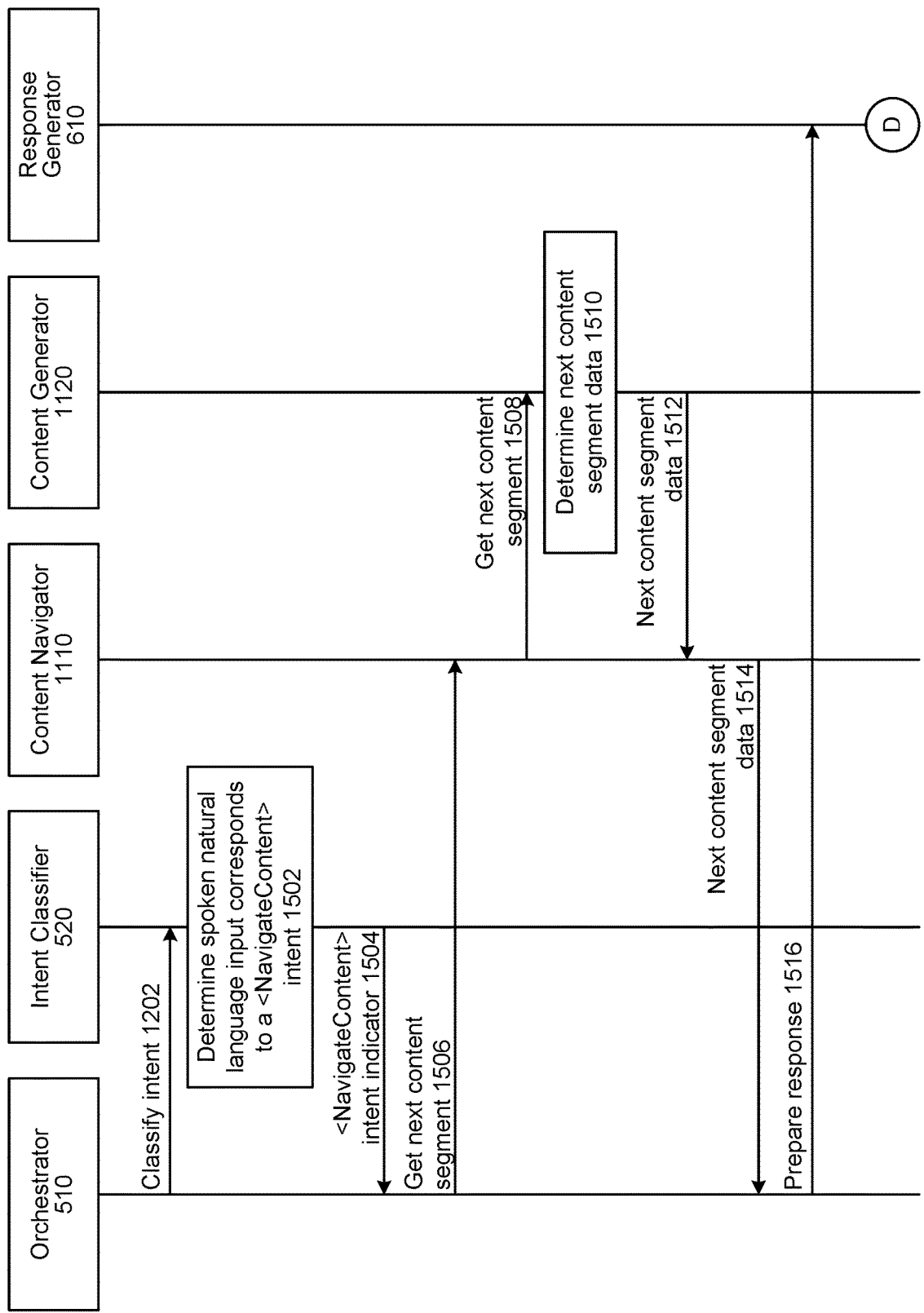
FIGS. 15A-15B are a signal flow diagram illustrating processing that may be performed in response to a <NavigateContent> intent, according to embodiments of the present disclosure.
Figure 15B:
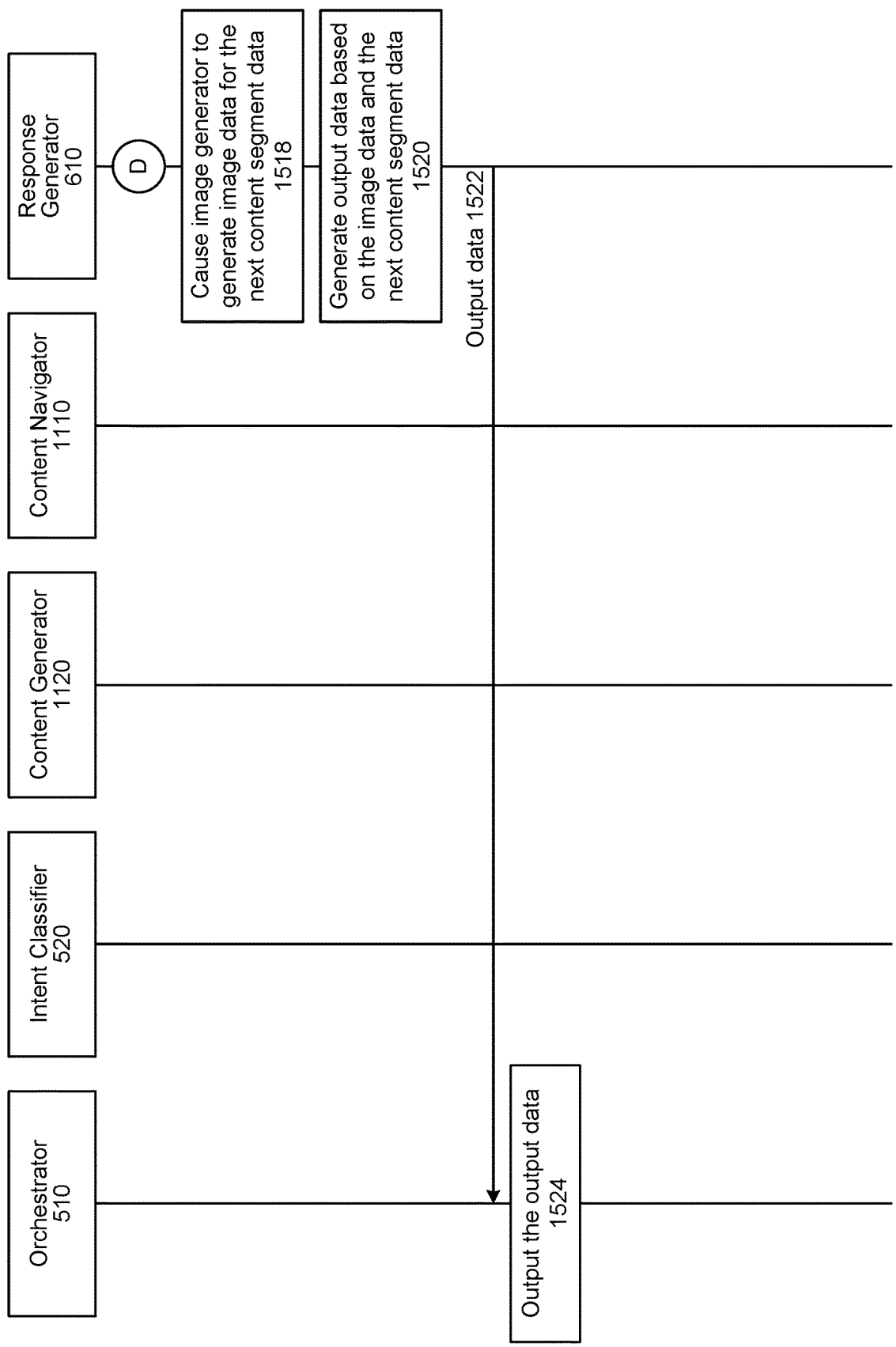

In some instances, a user may request a next segment of content (e.g., a next page of a story, a next painting of a museum tour, etc.) be output. FIGS. 15A-15B are a signal flow diagram illustrating processing of the dialog management component 385 to output a next segment of content.

Upon receiving spoken natural language input data 505, the orchestrator component 510 may send (1202) a call to the intent classifier component 520 to classify an intent of the spoken natural language input. The call may include ASR output data represented in the first spoken natural language input data 505.

The intent classifier component 520 may process the ASR output data, as described herein above, to determine (1502) the spoken natural language input corresponds to a <NavigateContent> intent. For example, such a spoken natural language input may correspond to "next page." The intent classifier component 520 may send (1504), to the orchestrator component 510, a <NavigateContent> indicator.

In response to receiving the <NavigateContent> intent indicator, the orchestrator component 510 may send (1506), to the content navigator component 1110, a call to get a next content segment. In some instances, the call may include a dialog identifier (of the present dialog) and a content identifier (e.g., a story identifier) of the content (e.g., story) presently being output.

In turn, the content navigator component 1110 may send (1508), to the content generator component 1120, a call to get the next content segment. In some instances, the call may include a dialog identifier (of the present dialog) and a content identifier (e.g., a story identifier) of the content (e.g., story) presently being output.

The content generator component 1120 in turn may determine (1510) next content segment data. This may include the content generator component 1120 querying the content storage 570 for a next content segment (e.g., natural language text of a next page of a story) corresponding to the content identifier of the current content being output. The content generator component 1120 may process, as described herein, to generate the next content segment data based on the received next content segment and any applicable user/group preference(s).

The content generator component 1120 may send (1512) the next content segment data to the content navigator component 1110, which may store a record of the next content segment data for purposes of processing in response to a yet to be received spoken natural language input requesting a next content segment. The content navigator component 1110 may send (1514) the next content segment data to the orchestrator component 510, which may send (1516), to the response generator component 610, a call to prepare a response based on the next content segment data.

The response generator component 610 may cause (1518) the image generator component 620 to generate image data, as described herein, for the next content segment data (which may be natural language text data corresponding to the next content segment). The response generator component 610 may process, as described herein above, to generate (1520) output data based on the image data and the next content segment data. The response generator component 610 sends (1522) the output data to the orchestrator component 510.

The orchestrator component 510, in turn, outputs (1524) the output data. For example, the output data may include audio data, including synthesized speech corresponding to the next content segment, the image data, and video data including an avatar configured to exhibit motion so the avatar appears to be speaking the synthesized speech as it is output. Moreover, the video data may include subtitles configured to indicate a particular word as synthesized speech of the particular word is being output. The orchestrator component 510 may cause the device 110 to output the content of the output data by sending the output data to the device 110 or sending the output data to one or more device components (e.g., in the situation where the device 110 is implementing the dialog management component 385).

In some instances, as described herein, the user 5 may ask the dialog management component 385 a question, or the dialog management component 385 may ask the user 5 a question. Sometime after the Q&A experience is complete, the user 5 may provide a spoken natural language input to resume output of the content (e.g., resume output of the story). In response to receiving such spoken natural language input, the dialog management component 385 may determine the spoken natural language input corresponds to a <ResumeContent> intent, and cause the components of the dialog management component 385 to process as described above with respect to FIGS. 15A-15B.

In some embodiments, after the dialog management component 385 has finished outputting a store, the dialog management component 385 may ask the user 5 to retell the story. In such embodiments, the device 110 may display content including subtitles of the story, and the dialog management component 385 may measure the correctness of speech of the user 5 reading the subtitles.

Figure 16:
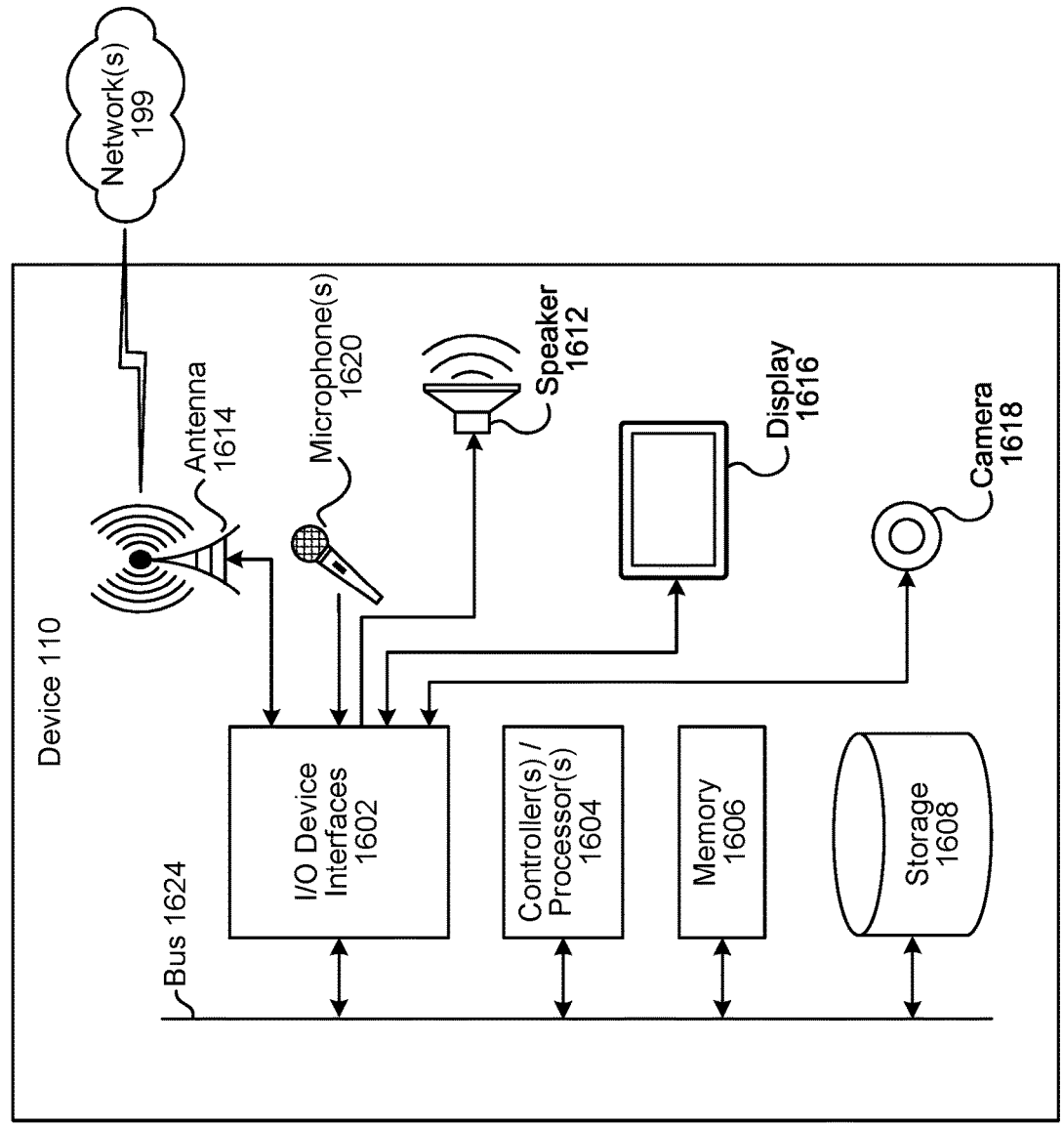
FIG. 16 is a block diagram conceptually illustrating example components of a device, according to embodiments of the present disclosure.
Figure 17:
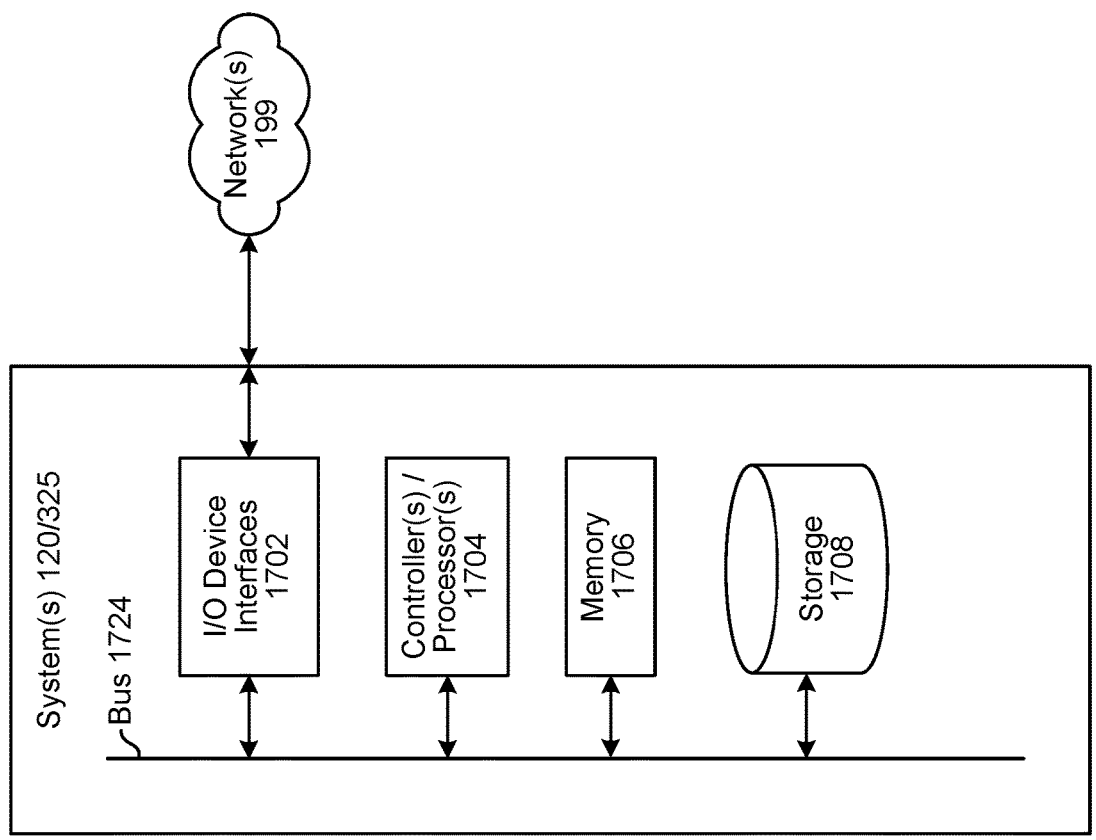
FIG. 17 is a block diagram conceptually illustrating example components of a system, according to embodiments of the present disclosure.

FIG. 16 is a block diagram conceptually illustrating a device 110 that may be used with the system 120. FIG. 17 is a block diagram conceptually illustrating example components of a remote device, such as the system 120 or a skill 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/325) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/325) may be included in the system 100 of the present disclosure, such as one or more systems 120 and/or one or more skills 325. In operation, each of these systems may include computer-readable and computer-executable instructions that reside on the respective device (120/325), as will be discussed further below.

Each of these devices (110/120/325) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120/325) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (1602/1702).

Computer instructions for operating each device (110/120/325) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120/325) includes input/output device interfaces (1602/1702). A variety of components may be connected through the input/output device interfaces (1602/1702), as will be discussed further below. Additionally, each device (110/120/325) may include an address/data bus (1624/1724) for conveying data among components of the respective device. Each component within a device (110/120/325) may also be directly connected to other components in addition to (or instead of) being connected to other components across the bus (1624/1724).

Referring to FIG. 16, the device 110 may include input/output device interfaces 1602 that connect to a variety of components such as an audio output component such as a speaker 1612, a wired headset or a wireless headset (not illustrated), or other component capable of outputting audio. The device 110 may also include an audio capture component. The audio capture component may be, for example, a microphone 1620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content. The device 110 may further include a camera 1618.

Via antenna(s) 1614, the input/output device interfaces 1602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device 110, the system 120, and/or the skill 325 may include their own dedicated processors, memory, and/or storage. Alternatively, one or more of the components of the device 110, the system 120, and/or the skill 325 may utilize the I/O interfaces (1602/1702), processor(s) (1604/1704), memory (1606/1706), and/or storage (1608/1708) of the device 110, the system 120, or the skill 325, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 325, as described herein, are illustrative, and may be located as a stand-alone device or may be included, in whole or in part, as a component of a larger device or system.

Figure 18:
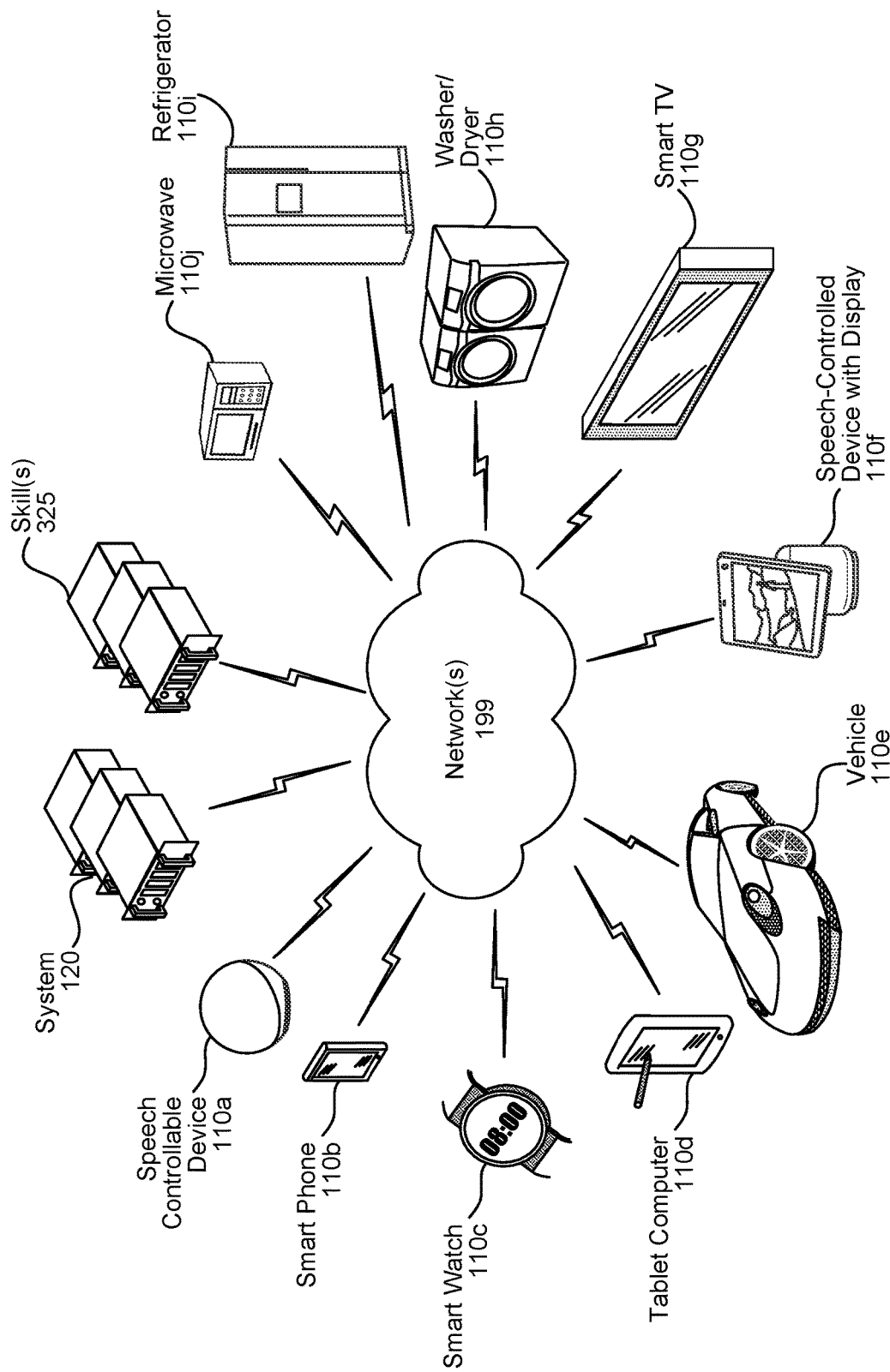
FIG. 18 illustrates an example of a computer network for use with the overall system, according to embodiments of the present disclosure.

As illustrated in FIG. 18, multiple devices (110a-110j, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 325, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input audio data corresponding to a first spoken natural language input;
   determining the first spoken natural language input includes:
     a first portion requesting first content be output; and
     a second portion representing a first parameter to be used instead of a second parameter included in the first content;
   generating, by a content generator component, first natural language data corresponding to the first content updated to include the first parameter instead of the second parameter;
   generating, by an image generator component, first image data representing the first natural language data;
   generating, by an avatar generator component, first video data including a representation of an avatar corresponding to the first natural language data; and
   generating, by a response generator component, first output data including the first image data, first output audio data including first synthesized speech corresponding to the first natural language data, and the first video data, wherein the first output data synchronizes display of the representation of the avatar with output of the first synthesized speech.

2. The computer-implemented method of claim 1, further comprising:
   determining, by the content generator component, second natural language data corresponding to the first content;
   determining, by the content generator component, a portion of the second natural language data corresponding to the first second parameter; and
   generating, by the content generator component, the first natural language data by performing natural language generation processing to replace the portion with the first parameter.

3. The computer-implemented method of claim 1, further comprising:
   determining, by a question and answering (Q&A) component, a dialog identifier corresponding to an ongoing dialog;
   determining, by the Q&A component, second natural language data associated with the dialog identifier, the second natural language data being represented in previous output data;
   generating, by the Q&A component, third natural language data corresponding to a question related to the second natural language data;
   generating, by the avatar generator component, first data including the representation of the avatar corresponding to the third natural language data;
   receiving, by the response generator component, the third natural language data and the first data;
   sending, by the response generator component, the third natural language data to a text-to-speech (TTS) component;
   receiving, by the response generator component, second output audio data from the TTS component, the second output audio data including second synthesized speech corresponding to the third natural language data; and
   generating, by the response generator component, second output data including the first data and the second output audio data, the second output data synchronizing display of the representation of the avatar with output of the second synthesized speech.

4. The computer-implemented method of claim 1, further comprising:
   determining a user identifier corresponding to the first input audio data;
   querying, by the content generator component, a profile storage for a parameter associated with the user identifier;
   receiving, by the content generator component and from the profile storage, first data representing a third parameter; and
   generating, by the content generator component, the first natural language data further based at least in part on the third parameter.

5. The computer-implemented method of claim 1, further comprising:
   receiving second input audio data corresponding to a second spoken natural language input;
   determining the second spoken natural language input requests a next segment of content be output;
   determining a content identifier corresponding to the first content;
   receiving, by a content navigator component, the content identifier and a request for a next segment of the first content;
   determining, by the content generator component and based at least in part on the content navigator component receiving the content identifier and the request, second natural language data associated with the content identifier and corresponding to the next segment;
   generating, by the content generator component, third natural language data by replacing at least a first portion of the second natural language data with the first parameter;

generating, by the image generator component, second image data representing the third natural language data; and generating, by the response generator component, second output data including the second image data and second output audio data including second synthesized speech corresponding to the third natural language data.

6. The computer-implemented method of claim 1, further comprising:
receiving, by the response generator component, the first output audio data from a text-to-speech component, the first output audio data including a start token and an end token corresponding to a portion of the first synthesized speech; and
generating, by the response generator component, the first output data to:
correspond a first portion of the first video data, corresponding to a beginning of a facial expression of the avatar, with a first portion of the first synthesized speech corresponding to the start token; and
correspond a second portion of the first video data, corresponding to an end of the facial expression, with a second portion of the first synthesized speech corresponding to the end token.

7. The computer-implemented method of claim 1, further comprising, by the response generator component:
configuring the first output audio data to correspond to a first output time duration; and
configuring the first video data to correspond to the first output time duration.

8. The computer-implemented method of claim 1, wherein the avatar corresponds to a first character and the method further comprises:
determining second natural language data corresponding to the first content;
determining the second natural language data corresponds to a second character; and
generating, by the avatar generator component, second video data including a representation of a second avatar different from the avatar.

9. The computer-implemented method of claim 8, wherein the first synthesized speech corresponds to first audio characteristics and the method further comprises:
generating, by the response generator component, second output audio data including second synthesized speech corresponding to the second natural language data, the second synthesized speech further corresponding to second audio characteristics different from the first audio characteristics.

10. A computing system comprising:
a first component configured to determine a first spoken natural language input includes:
a first portion requesting first content be output; and
a second portion representing a first parameter to be used instead of a second parameter included in the first content;
a content generator component configured to generate first natural language data corresponding to the first content updated to include the first parameter instead of the second parameter;
an image generator component configured to generate first image data representing the first natural language data;
an avatar generator component configured to generate first video data including a representation of an avatar corresponding to the first natural language data; and
a response generator component configured to generate first output data including the first image data, first output audio data including first synthesized speech corresponding to the first natural language data, and the first video data, the first output data synchronizing display of the representation of the avatar with output of the first synthesized speech.

11. The computing system of claim 10, wherein the content generator component is further configured to:
determine second natural language data corresponding to the first content;
determine a portion of the second natural language data corresponding to the second parameter; and
generate the first natural language data by performing natural language generation processing to replace the portion with the first parameter.

12. The computing system of claim 10, further comprising:
a question and answering component configured to:
determine a dialog identifier corresponding to an ongoing dialog;
determine second natural language data associated with the dialog identifier, the second natural language data being represented in previous output data; and
generate third natural language data corresponding to a question related to the second natural language data; and
the avatar generator component configured to generate first data including the representation of the avatar corresponding to the third natural language data,
wherein the response generator component is further configured to:
receive the third natural language data;
receive the first data;
send the third natural language data to a text-to-speech (TTS) component;
receive, from the TTS component, second output audio data including second synthesized speech corresponding to the third natural language data; and
generate second output data including the first data and the second output audio data, the second output data synchronizing display of the representation of the avatar with output of the second synthesized speech.

13. The computing system of claim 10, wherein the content generator component is further configured to:
determine a user identifier corresponding to the first spoken natural language input;
query a profile storage for a parameter associated with the user identifier;
receive, from the profile storage, first data representing a third parameter; and
generate the first natural language data further based at least in part on the third parameter.

14. The computing system of claim 10, wherein:
the first component is further configured to determine a second spoken natural language input requests a next segment of content be output;
a content generator component is further configured to:
determine a content identifier corresponding to the first content;
determine second natural language data associated with the content identifier and corresponding to the next segment; and
generate third natural language data by replacing at least a first portion of the second natural language data with the first parameter;

the image generator component is further configured to generate second image data representing the third natural language data; and the response generator component is further configured to generate second output data including the second image data and second output audio data including second synthesized speech corresponding to the third natural language data.

15. The computing system of claim 10, wherein the response generator component is further configured to:

receive the first output audio data from a text-to-speech component, the first output audio data including a start token and an end token corresponding to a portion of the first synthesized speech; and generate the first output data to:

correspond a first portion of the first video data, corresponding to a beginning of a facial expression of the avatar, with a first portion of the first synthesized speech corresponding to the start token; and correspond a second portion of the first video data, corresponding to an end of the facial expression, with a second portion of the first synthesized speech corresponding to the end token.

16. The computing system of claim 10, wherein the response generator component is further configured to:

configure the first output audio data to correspond to a first output time duration; and configure the first video data to correspond to the first output time duration.

17. The computing system of claim 10, wherein the system is further configured to:

determine second natural language data corresponding to the first content;

determine the second natural language data corresponds to a second character; and generate, by the avatar generator component, second video data including a representation of a second avatar different from the avatar.

18. The computing system of claim 17, wherein the first synthesized speech corresponds to first audio characteristics and wherein the system is further configured to:

generate, by the response generator component, second output audio data including second synthesized speech corresponding to the second natural language data, the second synthesized speech further corresponding to second audio characteristics different from the first audio characteristics.

\* \* \* \* \*